US011780525B2

(12) United States Patent
Poonsawat et al.

(10) Patent No.: US 11,780,525 B2
(45) Date of Patent: Oct. 10, 2023

(54) SADDLE RIDE TYPE VEHICLE

(71) Applicant: HONDA MOTOR CO., LTD., Tokyo (JP)

(72) Inventors: Puntawee Poonsawat, Bangkok (TH); Pongsanat Yingyongdamronggun, Bangkok (TH); Shinichiro Ishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 228 days.

(21) Appl. No.: 17/437,988

(22) PCT Filed: Mar. 24, 2020

(86) PCT No.: PCT/JP2020/013024
§ 371 (c)(1),
(2) Date: Sep. 10, 2021

(87) PCT Pub. No.: WO2020/196523
PCT Pub. Date: Oct. 1, 2020

(65) Prior Publication Data
US 2022/0169328 A1    Jun. 2, 2022

(30) Foreign Application Priority Data

Mar. 25, 2019    (JP) ................................. 2019-056287

(51) Int. Cl.
*B62J 17/04*    (2006.01)
(52) U.S. Cl.
CPC ..................................... *B62J 17/04* (2013.01)
(58) Field of Classification Search
CPC ...................................................... B62J 17/04
See application file for complete search history.

(56) References Cited

U.S. PATENT DOCUMENTS 6,543,831 B2 *   4/2003   Takemura ................ B62J 17/04
                                                        296/78.1
7,946,642 B1 *   5/2011   Wu .......................... B62J 17/04
                                                        296/89
(Continued)

FOREIGN PATENT DOCUMENTS

CN    108128381 A  *  6/2018   .............. B62J 17/04
CN    113613988 A  *  11/2021  .............. B62J 17/04
(Continued)

OTHER PUBLICATIONS

Japanese Office Action, Application No. JP 2021-509452, dated Aug. 30, 2022, with English translation, 5 pages.
(Continued)

*Primary Examiner* — Dennis H Pedder
*Assistant Examiner* — Melissa Ann Bonifazi
(74) *Attorney, Agent, or Firm* — Rankin, Hill & Clark LLP

(57) ABSTRACT

A saddle ride type vehicle including a movable windscreen structure capable of improving operability at low cost. A shaft is supported by a fixing member so as to be vertically movable, the shaft passes through a lower upright portion of a screen attachment member provided on the outer side in the vehicle width direction of the fixing member, and an operation unit is slidably provided at the end portion of the shaft. The operation unit includes a grip portion gripped when being slid and a flange portion disposed inside in the vehicle width direction of the grip portion, the grip portion includes an outer grip portion disposed outside in the vehicle width direction and an inner grip portion disposed inside in the vehicle width direction of the outer grip portion, and the flange portion is formed to have a larger diameter than the inner grip portion.

19 Claims, 17 Drawing Sheets

(56) References Cited

U.S. PATENT DOCUMENTS

| | | | |
|---|---|---|---|
| 9,132,875 B2* | 9/2015 | Kato | B62J 17/04 |
| 9,387,899 B1* | 7/2016 | Mueller | B62J 17/04 |
| 9,937,972 B2* | 4/2018 | Nakano | B62J 17/04 |
| 11,530,010 B2* | 12/2022 | Sawada | B62J 17/04 |
| 2007/0296237 A1* | 12/2007 | Anderson | B62J 17/04 |
| | | | 296/78.1 |
| 2018/0244134 A1 | 8/2018 | Beeman et al. | |
| 2022/0144366 A1* | 5/2022 | Naoi | B62J 17/04 |

FOREIGN PATENT DOCUMENTS

| | | | |
|---|---|---|---|
| CN | 113613988 B * | 1/2023 | B62J 17/04 |
| EP | 2923927 A1 | 9/2015 | |
| EP | 3061681 A1 | 8/2016 | |
| JP | 2011116308 A * | 6/2011 | |
| JP | 2016-159719 A | 9/2016 | |
| JP | 2017-124808 A | 7/2017 | |
| JP | 6332809 | 5/2018 | |

OTHER PUBLICATIONS

Indian Office Action dated Mar. 17, 2022, 6 pages.
European Office Action dated Jan. 16, 2023 issued in corresponding European application No. 20 777 420.9; English text (14 pages).
International Preliminary Report on Patentability dated Oct. 7, 2021, 6 pages.
European Search Report dated Apr. 13, 2022, Application No. 20777420.9, 8 pages.
Chinese Office Action with English Translation dated Apr. 28, 2022, Application No. CN202080021219A, 16 pages.
International Search Report, dated Jun. 9, 2020, 4 pages.
Written Opinion of the International Searching Authority dated Jun. 9, 2020 filed in PCT/JP2020/013024, 3 pages.

* cited by examiner

FIG. 7
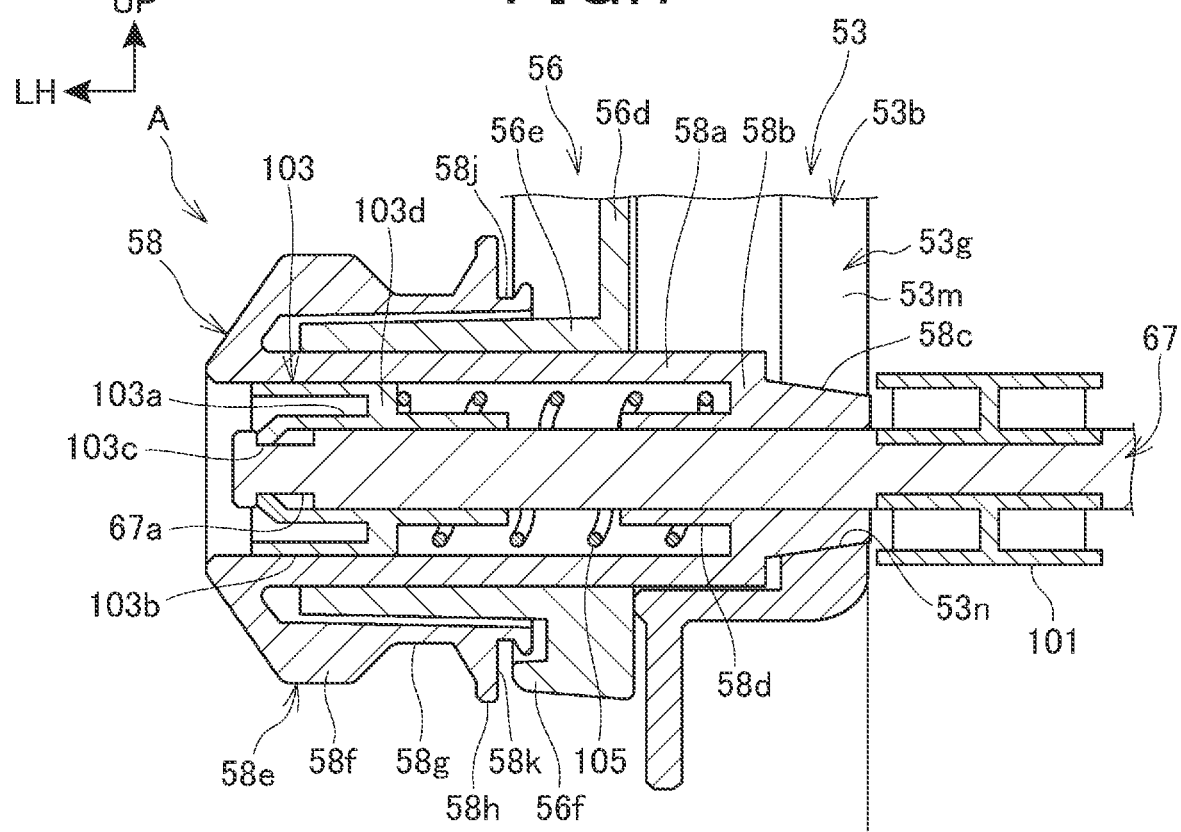
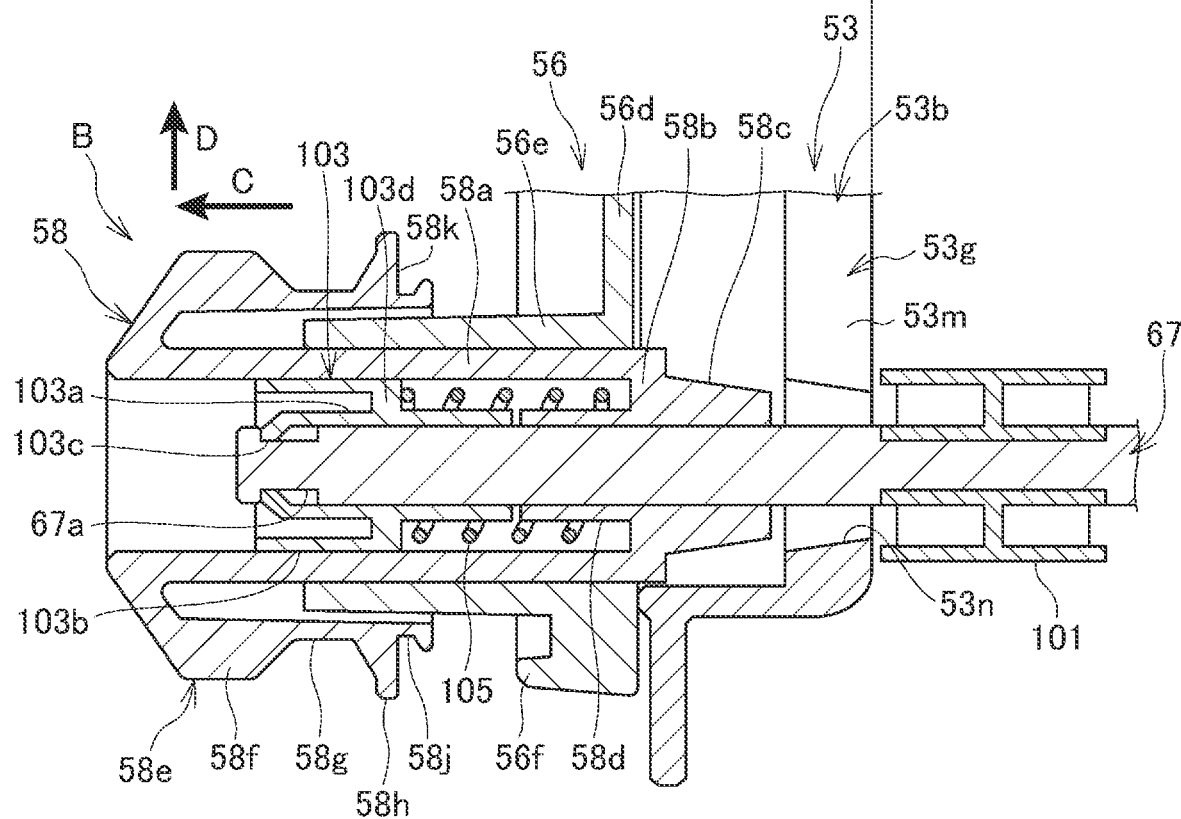

SADDLE RIDE TYPE VEHICLE

TECHNICAL FIELD

The present invention relates to a saddle ride type vehicle.

BACKGROUND ART

Conventionally, there has been disclosed a saddle ride type vehicle including a windscreen whose height is adjustable (see, for example, Patent Literature 1).

CITATION LIST

Patent Literature

Patent Literature 1: JP 6332809 B2

SUMMARY OF INVENTION

Technical Problem

In Patent Literature 1, it is desired to reduce the number of components in a height-adjustable windscreen structure and to configure the windscreen structure simply at low cost. In order to reduce the cost, it is conceivable that the user manually adjusts the height, but in the case of such a structure, it is required to have a configuration that is easy for the user to operate.

An object of the present invention is to provide a saddle ride type vehicle having a movable windscreen structure capable of improving operability at low cost.

Solution to Problem

This specification includes all the contents of Japanese Patent Application No. 2019-056287 filed on Mar. 25, 2019.

A saddle ride type vehicle includes: a windscreen (42); a holder portion (56) that supports the windscreen (42); and a bracket (53) that vertically movably supports the holder portion (56) together with the windscreen (42) and is fixed to a vehicle body, in which a shaft (67) is vertically movably supported by the bracket (53), the shaft (67) passes through an extending portion (56d) of the holder portion (56) provided outside in a vehicle width direction of the bracket (53), an operation unit (58) is slidably provided at an end portion of the shaft (67), the operation unit (58) includes a grip portion (58e) gripped when being slid and a flange portion (58h) disposed inside in the vehicle width direction of the grip portion (58e), the grip portion (58e) includes an outer grip portion (58f) disposed outside in the vehicle width direction and an inner grip portion (58g) disposed inside in the vehicle width direction of the outer grip portion (58f), and the flange portion (58h) is formed to have a larger diameter than the inner grip portion (58g).

In the above configuration, the inner grip portion (58g) may be formed to have a smaller diameter than the outer grip portion (58f).

In addition, in the above configuration, the bracket (53) and the holder portion (56) may be provided with an abutment portion (107, 108) where the bracket (53) and the holder portion (56) abut against each other.

In addition, in the above configuration, the bracket (53) may include a meter fixing portion (53c) that fixes the meter (43) behind the holder portion (56).

In addition, in the above configuration, the meter (43) may be fixed by a fastening member (74) inserted from a side of the holder portion (56) to a meter fixing through-hole (53h) formed in the meter fixing portion (53c).

In addition, in the above configuration, a link (57) that connects the holder portion (56) to the bracket (53) may be provided, and the link (57) may be provided with a recessed portion (57d) that secures a tool path for tightening the fastening member (74) when the meter (43) is attached.

In addition, in the above configuration, the grip portion (58e) of the operation unit (58) may be disposed outside an outer side surface (55f) of the bracket (53) in the vehicle width direction.

Advantageous Effects of Invention

In a saddle ride type vehicle, a shaft is vertically movably supported by a bracket, the shaft passes through an extending portion of a holder portion provided outside in a vehicle width direction of the bracket, an operation unit is slidably provided at an end portion of the shaft, the operation unit includes a grip portion gripped when being slid and a flange portion disposed inside in the vehicle width direction of the grip portion, the grip portion includes an outer grip portion disposed outside in the vehicle width direction and an inner grip portion disposed inside in the vehicle width direction of the outer grip portion, and the flange portion is formed to have a larger diameter than the inner grip portion. Thus, while achieving cost reduction by adopting a structure in which the operation unit is manually operated, since the operation unit can be operated while preventing insertion of a finger between the flange portion and the holder portion by disposing the flange portion between the grip portion and the holder portion, it is possible to improve operability of the operation unit.

In the above configuration, since the inner grip portion is formed to have a diameter smaller than the outer grip portion, by providing the inner grip portion, it is possible to put fingers on the grip portion easily and improve the operability of the operation unit.

In addition, in the above configuration, the bracket and the holder portion are provided with the abutment portions where the bracket and the holder portion abut against each other, so that it is possible to hold the bracket and the holder portion without rattling by providing the abutment portion, and thus it is possible to improve the merchantability and also the operation feeling.

In addition, in the above configuration, since the bracket includes the meter fixing portion that fixes the meter behind the holder portion, the bracket can also serve as the meter fixing portion, and it is possible to reduce the number of parts.

In addition, in the above configuration, since the meter is fixed by the fastening member inserted from the holder portion side into the meter fixing through-hole formed in the meter fixing portion, the meter is fixed to the meter fixing portion from the backside so that it is possible to improve appearance around the meter and also downsize the bracket.

In addition, in the above configuration, the link that connects the holder portion to the bracket is provided, and the link is provided with the recessed portion that secures the tool path for tightening the fastening member when the meter is attached so that it is possible to improve attachment workability of the meter and the rigidity of the link itself.

In addition, in the above configuration, since the grip portion of the operation unit is disposed outside the outer side surface of the bracket in the vehicle width direction, it is possible to grip the grip portion of the operation unit easily gripped by extending the hand forward at the side of the outer side surface of the bracket.

BRIEF DESCRIPTION OF DRAWINGS

FIG. 7 is a cross-sectional view illustrating a mounting structure and an operation of an operation unit.

DESCRIPTION OF EMBODIMENTS

An embodiment of the present invention will be described below with reference to the drawings. Note that, in the description, directions such as front, rear, left, right, up, and down directions are the same as directions with respect to a vehicle body unless otherwise specified. In addition, in each of the drawings, reference symbol FR denotes forward of the vehicle body, reference symbol UP denotes upward of the vehicle body, and reference symbol LH denotes leftward of the vehicle body.

Figure 1:
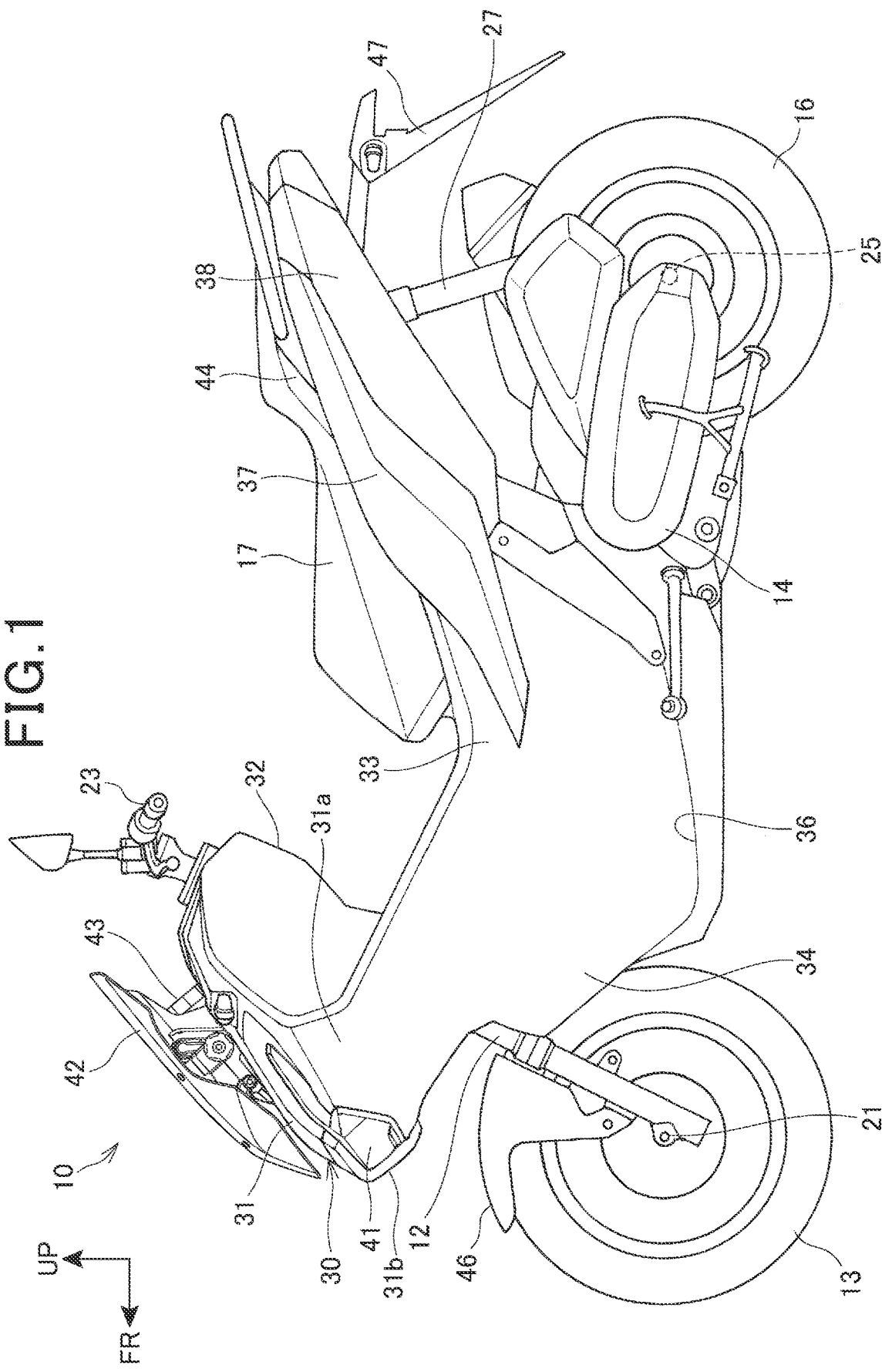
FIG. 1 is a left side view illustrating a motorcycle according to an embodiment of the present invention.

FIG. 1 is a left side view illustrating a motorcycle 10 according to an embodiment of the present invention.

The motorcycle 10 is a saddle ride type vehicle including a vehicle body frame, a front fork 12, a front wheel 13, a power unit 14, a rear wheel 16, and a seat 17.

A front fork 12 is supported at a front end portion of the vehicle body frame so as to be steerable, and a front wheel 13 is supported at a lower end portion of the front fork 12 via an axle 21. In addition, a bar handle 23 is supported at an upper end portion of the front fork 12.

A power unit 14 is supported in a lower portion of the vehicle body frame so as to be vertically swingable, and a rear wheel 16 is supported at a rear end portion of the power unit 14 via an axle 25. A tandem-type seat 17 is disposed above a rear portion of the vehicle body frame.

A rear cushion unit 27 which is a shock absorber is provided across the rear end portion of the power unit 14 and the rear portion of the vehicle body frame.

The vehicle body frame is covered with a vehicle body cover 30. The vehicle body cover 30 includes a front cover 31, a front inner cover 32, a seat front cover 33, a pair of left and right leg shields 34, a pair of left and right floor steps 36, a pair of left and right body covers 37, and a rear lower cover 38.

The front cover 31 covers the front portion of the vehicle body frame from the front and both sides. A headlight 41 is disposed on the front cover 31, and a movable windscreen 42 is disposed above an upper portion of the front cover 31. A meter 43 is disposed below the windscreen 42 and above the front cover 31.

The front cover 31 includes a pair of left and right front side covers 31a and a laterally long front cover 31b disposed so as to straddle the front surfaces of the left and right front side covers 31a.

A pair of left and right openings are formed in the front cover 31b, and the headlight 41 is exposed from the left and right openings.

The front inner cover 32 covers the front portion of the vehicle body frame from the rear. The seat front cover 33 extends from below the front portion of the seat 17 toward the front cover 31 side. The left and right leg shields 34 cover the leg portions of an occupant seated on the seat 17 from the front. The left and right floor steps 36 are portions on which the occupant places his/her feet. The left and right body covers 37 extend rearward from below the seat front cover 33. A grab rail 44 gripped by a passenger is disposed above the rear portions of the left and right body covers 37. The rear lower cover 38 is disposed below the left and right body covers 37 and covers the rear portion of the vehicle body above the rear wheel 16 from below.

The front wheel 13 is covered with a front fender 46 from above, and the rear wheel 16 is covered with a rear fender 47 from above.

Figure 2:
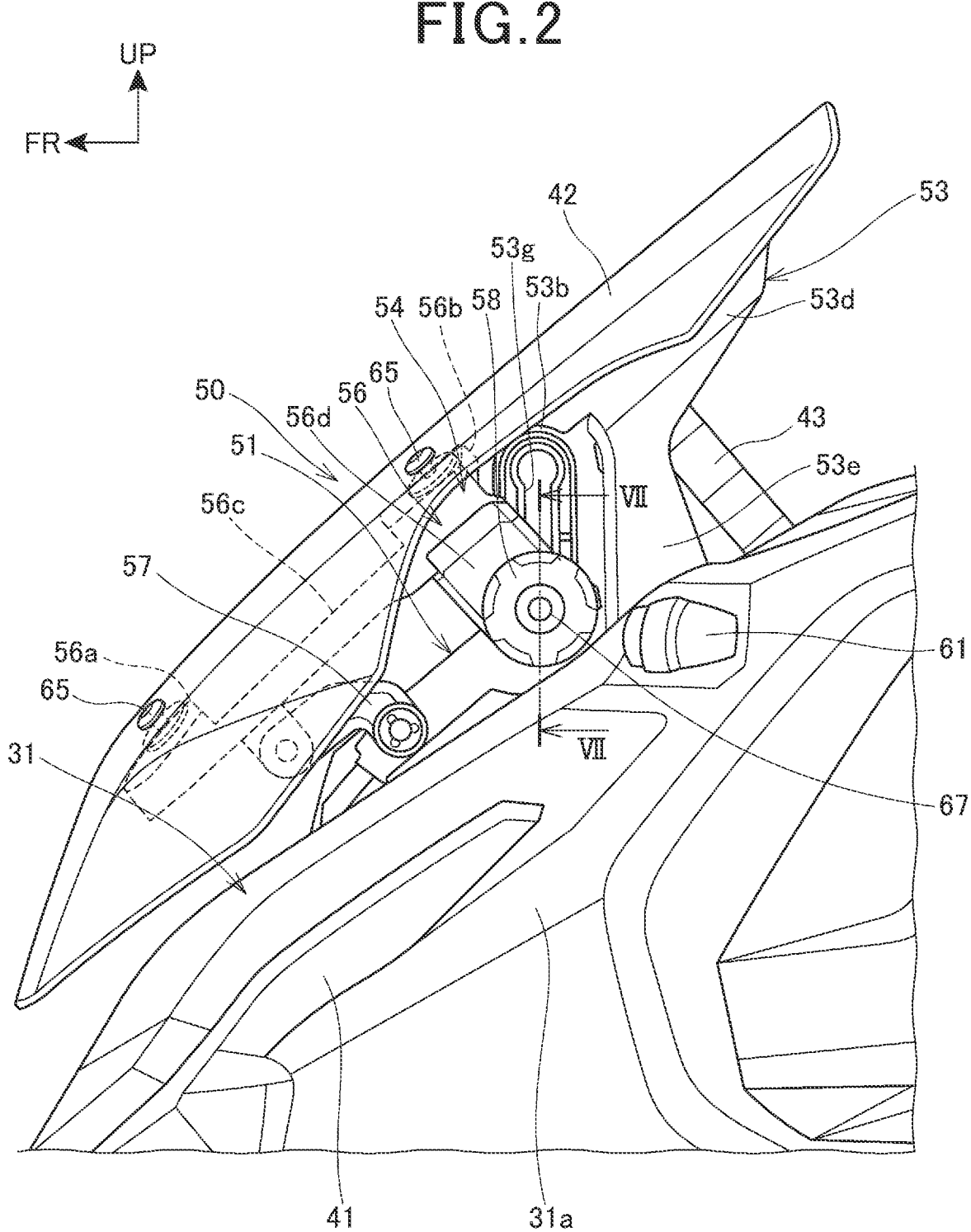
FIG. 2 is a left side view illustrating a windscreen and a periphery thereof.

FIG. 2 is a left side view illustrating the windscreen 42 and a periphery thereof.

The windscreen 42 is attached to the vehicle body side by a windscreen elevating mechanism 50 so as to be capable of elevating and capable of changing an inclination angle.

The windscreen 42 is attached to the vehicle body side by a screen stay 51.

The screen stay 51 includes a fixing member 53 fixed to the vehicle body side and a movable portion 54 movably supported by the fixing member 53.

The meter 43 disposed behind the movable portion 54 is attached to the fixing member 53.

The movable portion 54 includes a screen attachment member 56 to which the windscreen 42 is attached, and a link 57 coupled to each of the fixing member 53 and the screen attachment member 56 so as to be swingable.

A pair of left and right operation units 58 for manually elevating the windscreen 42 is provided on both sides of the rear portion of the screen attachment member 56. The left and right operation units 58 are disposed in front of a pair of left and right front blinkers 61 respectively attached to the left and right front side covers 31a as viewed in a side view of the vehicle.

The screen stay 51 and the right and left operation units 58 described above constitute the windscreen elevating mechanism 50.

Figure 3:
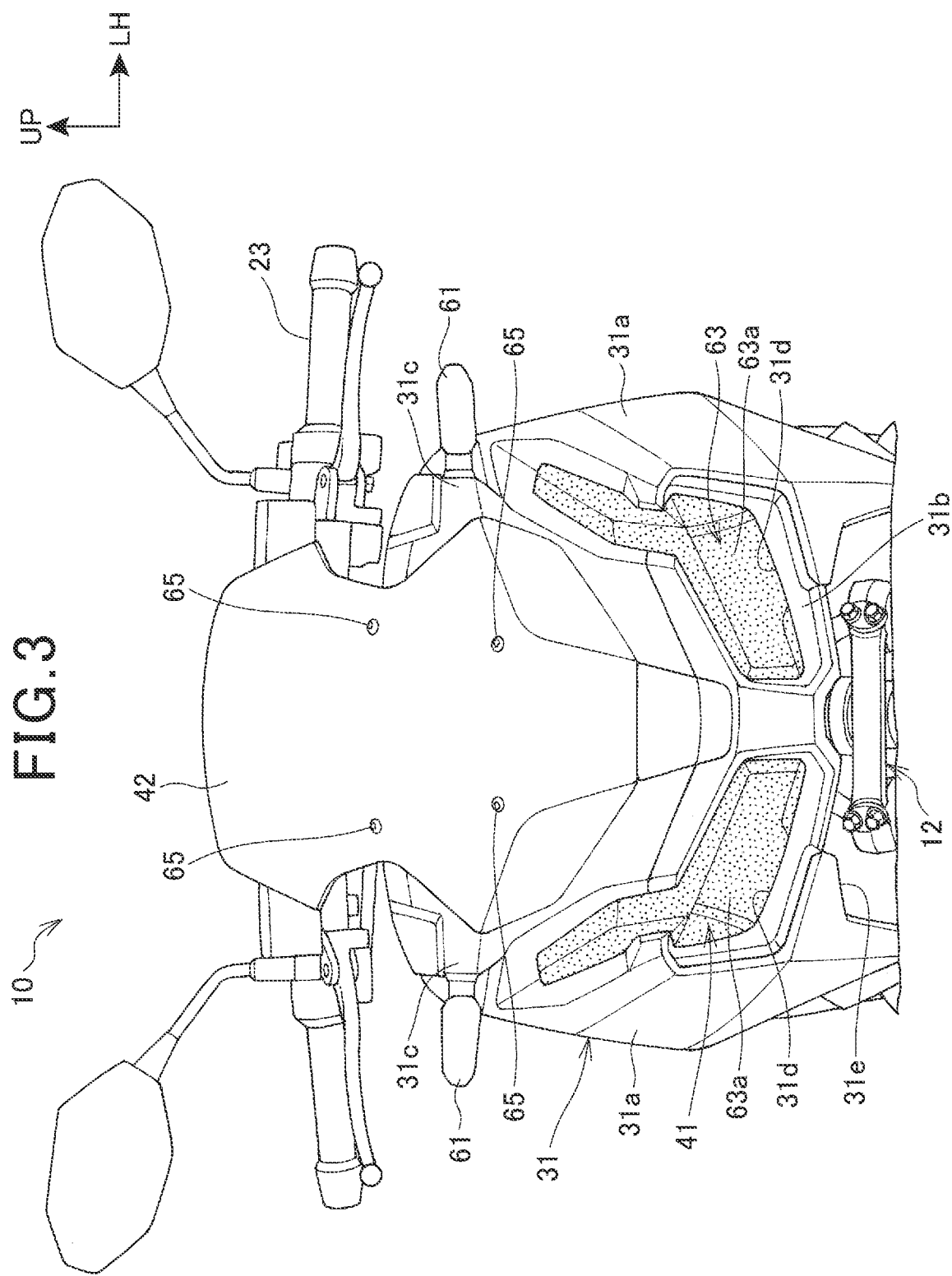
FIG. 3 is a front view illustrating an upper portion of a front portion of a vehicle body of a motorcycle.

FIG. 3 is a front view illustrating an upper portion of a front portion of a vehicle body of the motorcycle 10.

The left and right front side covers 31a include a pair of left and right blinker attachment portions 31c to which the left and right front blinkers 61 are attached. The left and right blinker attachment portions 31c are provided outside the windscreen 42 in the vehicle width direction as viewed in a front view of the vehicle, and the left and right front blinkers 61 extend outward in the vehicle width direction from the left and right blinker attachment portions 31c, respectively.

The front cover 31b is disposed horizontally so as to straddle the front surfaces of the left and right front side covers 31a, and the front cover 31b is provided with a pair of left and right light openings 31d for exposing a lens 63 of the headlight 41.

The lens 63 of the headlight 41 includes a pair of left and right lens main portions 63a (portions where a plurality of dots are drawn), and the left and right lens main portions 63a are exposed from the left and right light openings 31d.

Lower openings 31e through which lower portions of the front forks 12 extend are formed in the left and right front side covers 31a and the front cover 31b.

The windscreen 42 is attached to the screen attachment member 56 (see FIG. 2) by a plurality of screws 65.

Figure 4:
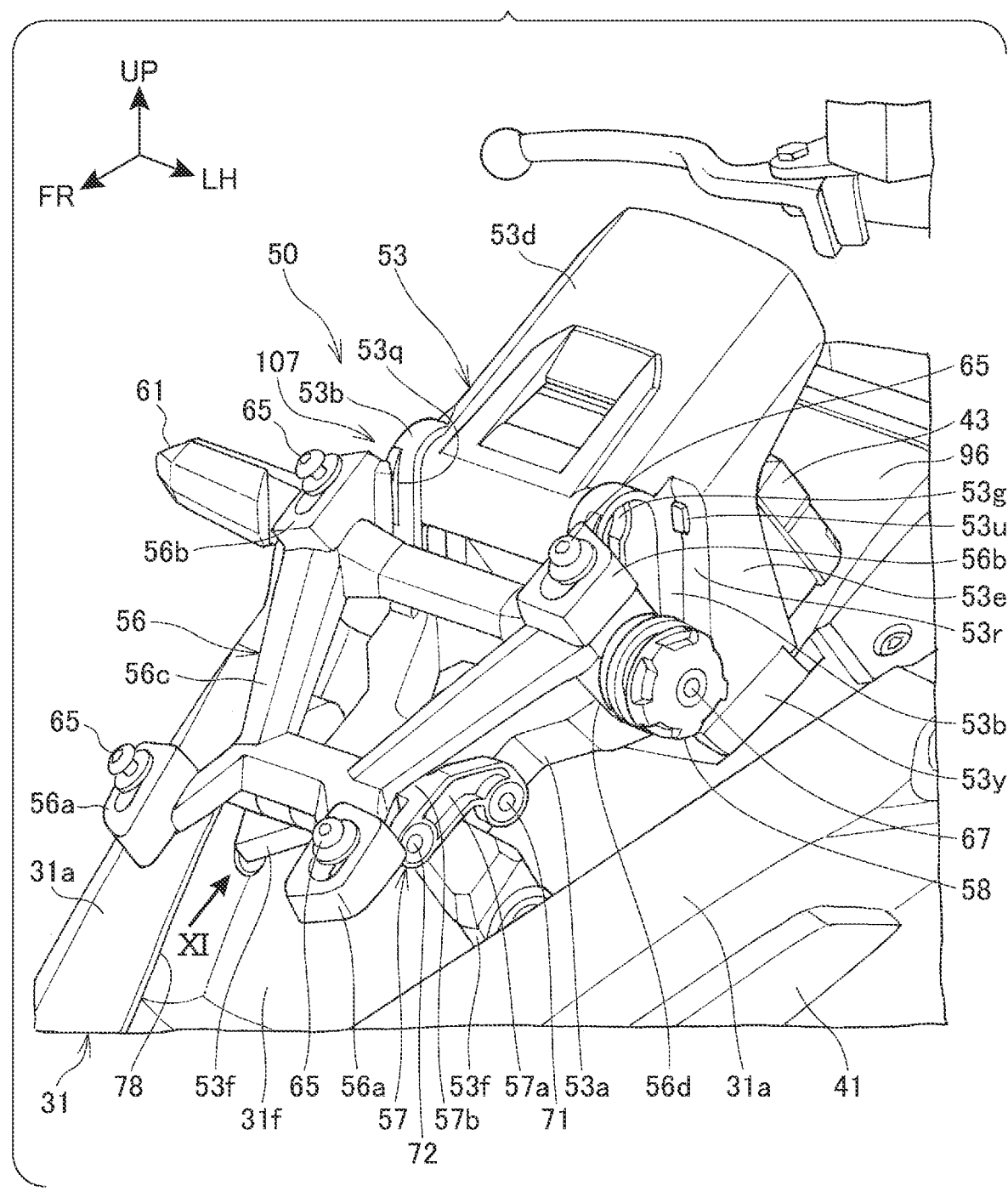
FIG. 4 is a first perspective view illustrating a windscreen elevating mechanism and a periphery thereof.
Figure 5:
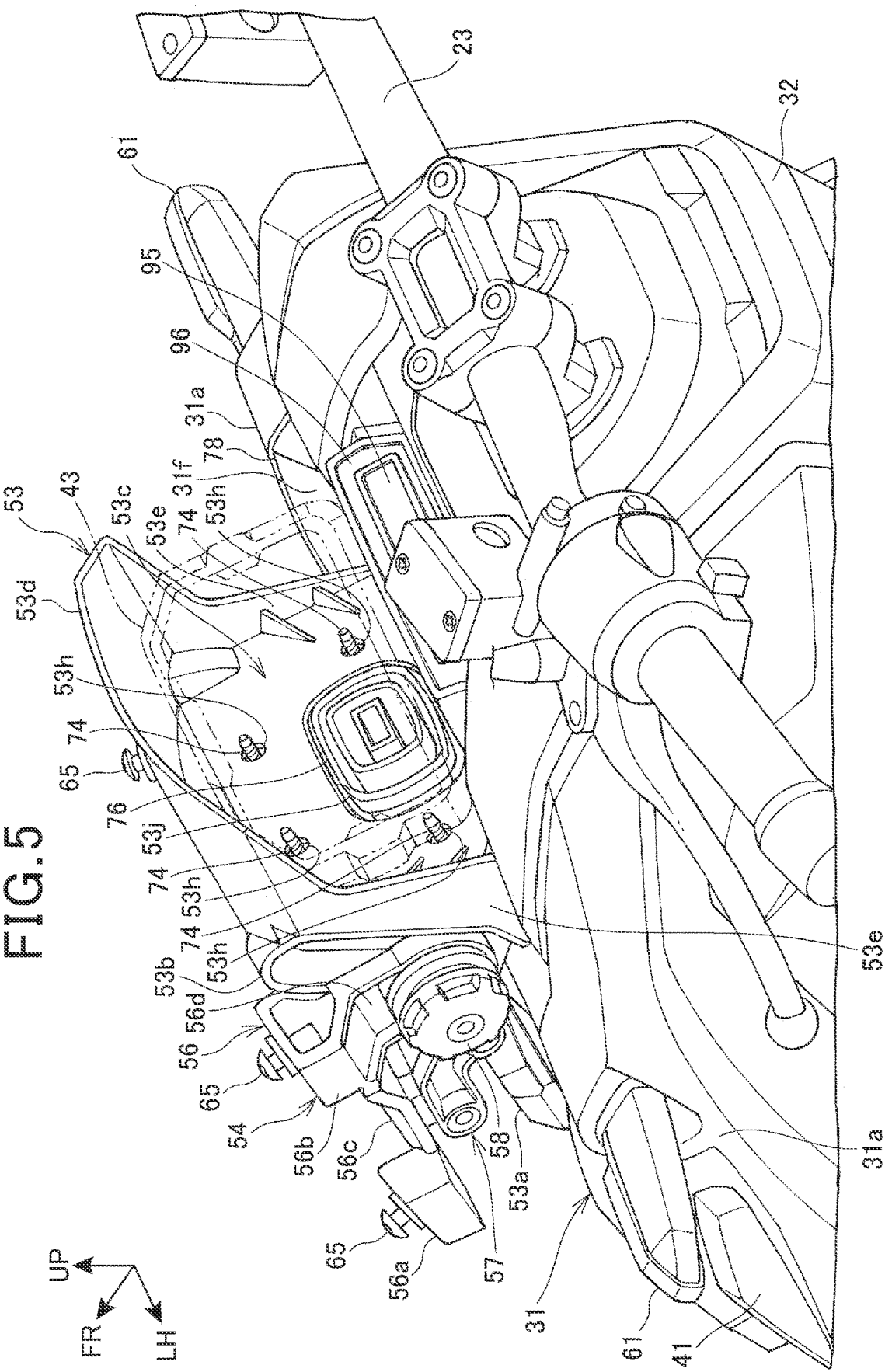
FIG. 5 is a second perspective view illustrating the windscreen elevating mechanism and a periphery thereof.

FIG. 4 is a first perspective view illustrating the windscreen elevating mechanism 50 and a periphery thereof, as viewed obliquely from the front. FIG. 5 is a second perspective view illustrating the windscreen elevating mechanism 50 and a periphery thereof, as viewed obliquely from the rear.

As illustrated in FIG. 4, the fixing member 53 integrally includes a front inclined portion 53a, a pair of left and right vertically extending portions 53b, a rear wall portion 53c (see FIG. 6), an overhanging portion 53d, a pair of left and right side wall portions 53e (only one side wall portion 53e is illustrated), and a pair of left and right rear left and right lower end portions 53y (only one rear left and right lower end portion 53y is illustrated).

The front inclined portion 53a is inclined rearward and upward and is attached to the vehicle body side (a front bracket 92 (see FIG. 6) to be described in detail later) by a pair of front left and right lower end portions 53f that protrude downward at the front end portion.

The left and right vertically extending portions 53b extend vertically from both end sides of the rear end portion of the front inclined portion 53a. Guide holes 53g linearly extending vertically are formed in the left and right vertically extending portions 53b.

The rear wall portion 53c is a portion connecting to the left and right vertically extending portions 53b in the vehicle width direction, to which the meter 43 is attached with a plurality of screws.

The overhanging portion 53d extends rearward and upward from the upper portion of the rear wall portion 53c and covers the meter 43 from above.

The left and right side wall portions 53e extend behind the left and right vertically extending portions 53b downward from the front side portions of the overhanging portion 53d. The left and right rear left and right lower end portions 53y extend sideways and downward from the lower end portions of the left and right side wall portions 53e, respectively, and are attached to the vehicle body side (specifically, the front bracket 92).

The screen attachment member 56 includes a pair of left and right lower attachment seats 56a, a pair of left and right upper attachment seats 56b, an attachment seat connection portion 56c, and a pair of left and right lower upright portions 56d (only one lower upright portion 56d is illustrated).

The left and right lower attachment seats 56a and left and right upper attachment seats 56b are portions into which screws 65 for attaching the windscreen 42 (see FIG. 2) are screwed.

The attachment seat connection portion 56c has a frame shape and integrally connects the left and right lower attachment seats 56a to the left and right upper attachment seats 56b.

The left and right lower upright portions 56d are portions extending downward and obliquely rearward from the left and right upper attachment seats 56b. A shaft 67 passing through the guide holes 53g of the left and right vertically extending portions 53b is passed through the left and right lower upright portions 56d, and the operation unit 58 is slidably provided at both end portions of the shaft 67.

The link 57 integrally includes a pair of left and right arm portions 57a (only one arm portion 57a is illustrated) and a cross portion 57b connecting the left and right arm portions 57a and extending in the vehicle width direction.

Each of rear end portions of the left and right arm portions 57a is respectively coupled so as to be swingable to the front inclined portion 53a of the fixing member 53 via the support shaft 71. Front end portions of the left and right arm portions 57a are coupled so as to be swingable to a lower portion of screen attachment member 56 via one support shaft 72.

As illustrated in FIG. 5, a rear wall portion 53c of the fixing member 53 has a plurality of screw insertion holes 53h through which screws 74 pass respectively in order to fix meter 43 (see FIG. 4) and a notch 53j through which connector 76 connected to the back surface of the meter 43 passes.

In FIG. 4, the opening 78 provided between the left and right front side covers 31a is covered with a front center cover 31f. The front center cover 31f constitutes a part of the front cover 31, and the front center cover 31f covers attachment portions of the front left and right lower end portions 53f of the front inclined portion 53a and the left and right side wall portions 53e of the fixing member 53 to the front bracket 92 (see FIG. 6). As a result, it is possible to improve the appearance.

Figure 6:
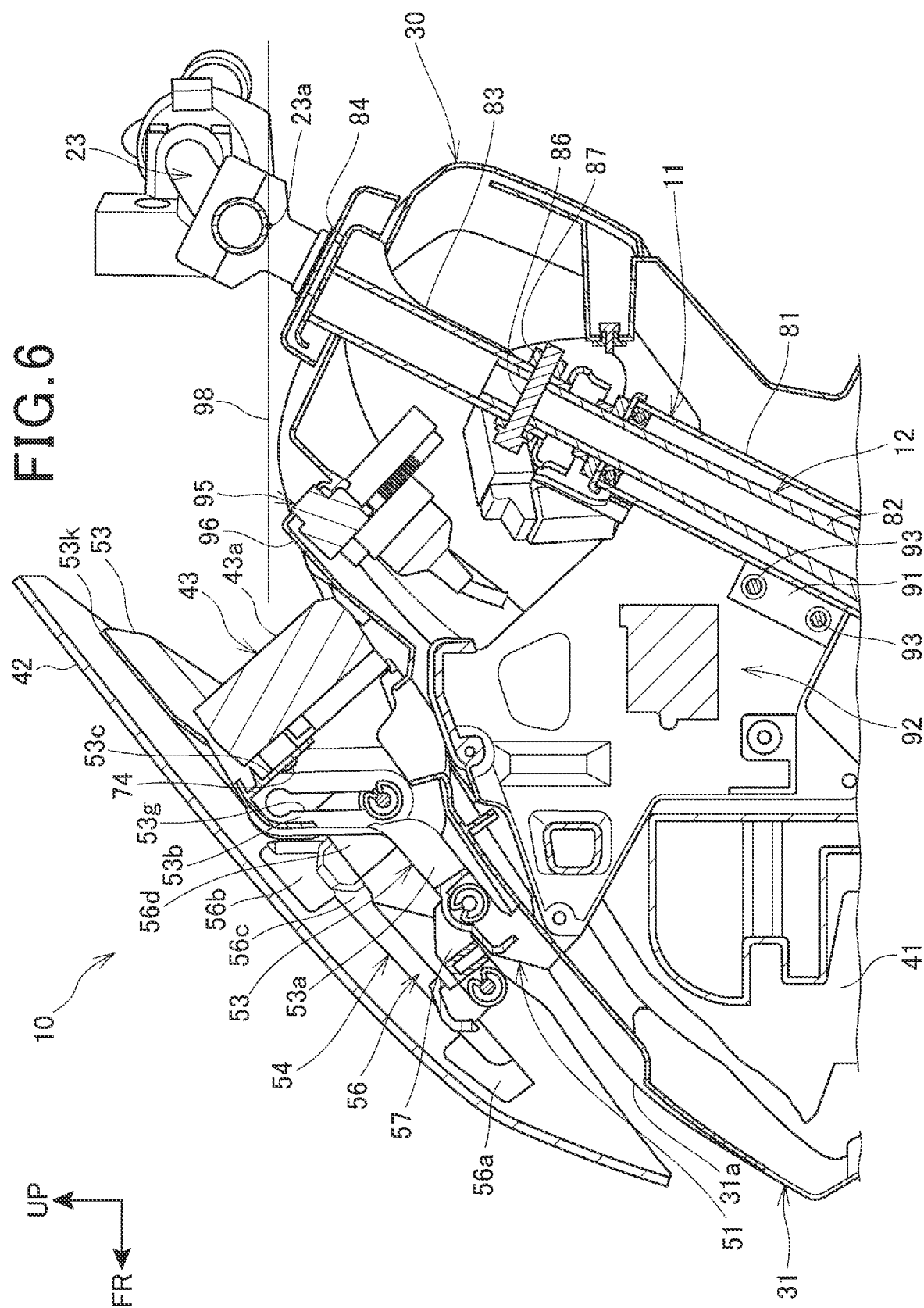
FIG. 6 is a cross-sectional view illustrating the front portion of the vehicle body of the motorcycle.

FIG. 6 is a cross-sectional view illustrating the front portion of the vehicle body of the motorcycle 10 and illustrates a cross section taken along a vehicle body centerline passing through the center in the vehicle width direction.

The motorcycle 10 includes a vehicle body frame 11 serving as a frame. The vehicle body frame 11 includes a head pipe 81 constituting a front end portion thereof.

The front fork 12 includes a steering shaft 82, an upper pipe 83, and an upper plate 84.

The steering shaft 82 is rotatably inserted into the head pipe 81. The upper pipe 83 is fastened to an upper end portion of the steering shaft 82 with a bolt 86 and a nut 87. The upper plate 84 is attached to an upper end portion of the upper pipe 83.

A protruding piece 91 protruding forward is fixed to a front portion of the head pipe 81, and a front bracket 92 is attached to the protruding piece 91 with a plurality of bolts 93.

The front bracket 92 supports the headlight 41 at a front portion and supports the windscreen 42 and the meter 43 at an upper portion.

Specifically, the windscreen 42 and the meter 43 are attached to the front bracket 92 via the screen stay 51.

The rear wall portion 53c of the fixing member 53 is inclined backward and downward, and the meter 43 is attached to the rear wall portion 53c with a plurality of screws 74. As a result, the display surface 43a of the meter 43 is directed rearward and obliquely upward.

The overhanging portion 53d extends rearward and upward from an upper portion of rear wall portion 53c, and rear end 53k of the overhanging portion 53d is positioned behind an upper end of a display surface 43a of the meter 43. As a result, a reflection of surrounding scenery, sky, or the like on the display surface 43a of the meter 43 is suppressed, and it is possible to improve visibility of the meter 43.

The windscreen 42 illustrated in the drawing is in a state of being located at the lowermost. From this state, by holding the left and right operation units 58 (see FIG. 4) with both hands and moving the operation units to the upper end of the guide hole 53g, the windscreen 42 can be disposed in a state of being the highest. In this case, the inclination angle of the windscreen 42 can be increased with the swing of the link 57.

A warning light unit 95 is disposed between the meter 43 and the bar handle 23, and a warning light unit cover 96 covering the warning light unit 95 is disposed between the meter 43 and the warning light unit 95.

The warning light unit 95 is attached to the inside of the warning light unit cover 96, and the warning light unit cover 96 is attached to the left and right front side covers 31a.

In the bar handle 23, the lowest lowermost end portion 23a is disposed at the center in the vehicle width direction, and when a horizontal line 98 extending forward from the lowermost end portion 23a is drawn, the warning light unit 95 is disposed below the horizontal line 98.

FIG. 7 is a cross-sectional view illustrating a mounting structure and an operation of the operation unit 58.

The cross-sectional view of the locked state of the operation unit 58 illustrated in A is a cross-sectional view taken along line VII-VII of FIG. 2, and the operation unit 58 is not movable with respect to the vertically extending portion 53b. In addition, in the unlocked state of the operation unit 58 illustrated in B, the operation unit 58 is movable with respect to the vertically extending portion 53b.

The vertically extending portion 53b of the fixing member 53, at the upper end portion and the lower end portion of the guide hole 53g, has a large-diameter hole portion 53n having an inner diameter larger than the width in the front-rear direction of the vertically intermediate portion 53m of the guide hole 53g. The inner peripheral surface of the large-diameter hole portion 53n is formed in a tapered shape in which the inner diameter increases toward the outside in the vehicle width direction. The shaft 67 penetrates the large-diameter hole portion 53n.

The lower upright portion 56d of the screen attachment member 56 includes a cylindrical portion 56e protruding outward in the vehicle width direction at the lower end portion and surrounding the periphery of the shaft 67, and a lower cover portion 56f covering the cylindrical portion 56e from below.

The operation unit 58 includes an inner cylinder 58a, a bottom portion 58b, a male tapered portion 58c, a small-diameter cylinder portion 58d, and a grip portion 58e.

The inner cylinder 58a is movably inserted into the cylindrical portion 56e of the screen attachment member 56. The male tapered portion 58c is formed in a tapered shape in which the outer peripheral surface becomes smaller toward the inside in the vehicle width direction, extends inward in the vehicle width direction from the bottom portion 58b of the inner cylinder 58a, and is fitted into the large-diameter hole portion 53n of the guide hole 53g of the fixing member 53.

The small-diameter cylinder portion 58d extends outward in the vehicle width direction from the bottom portion 58b of the inner cylinder 58a. The grip portion 58e is an outer cylinder that once extends radially outward from the outer end portion in the vehicle width direction of the inner cylinder 58a and covers the periphery of the inner cylinder 58a, and includes an outer grip portion 58f, an inner grip portion 58g, and a flange portion 58h in order from the outer side in the vehicle width direction.

The outer grip portion 58f and the inner grip portion 58g are portions to be gripped by hand at the time of operation, and the inner grip portion 58g has an outer diameter smaller than that of the outer grip portion 58f so that it is easy to place a hand on the outer grip portion 58f when sliding the operation unit 58 in the axial direction of the shaft 67.

The flange portion 58h is a portion that prevents fingers of the hand from entering between the operation unit 58 (specifically, the flange portion 58h) and the lower upright portion 56d of the screen attachment member 56 when the outer grip portion 58f and the inner grip portion 58g are gripped by hand.

An inner cylindrical portion 58j is integrally provided on the inner side of the flange portion 58h in the vehicle width direction. The inner cylindrical portion 58j constitutes a part of the operation unit 58.

The inner cylindrical portion 58j forms a labyrinth structure with the lower cover portion 56f of the screen attachment member 56 and is a portion that makes it difficult for a scattering object from the road surface side to enter between the cylindrical portion 56e of the screen attachment member 56 and the grip portion 58e.

In the shaft 67, a pair of left and right retaining members 101 is fitted inside the fixing member 53 in order to prevent it from becoming detached from the fixing member 53.

In addition, collar members 103 are fitted to both ends of the shaft 67. The collar member 103 integrally includes a small-diameter inner cylinder portion 103a fitted to the shaft 67 and a large-diameter outer cylinder portion 103b extending radially outward and outward in the vehicle width direction from a lengthwise intermediate portion of the inner cylinder portion 103a.

The inner cylinder portion 103a includes a tapered diameter-reduced portion 103c at an outer end portion in the vehicle width direction. The diameter-reduced portion 103c is fitted into an annular groove 67a formed at both ends of the shaft 67.

A compression coil spring 105 is disposed between the bottom portion 103d of the outer cylinder portion 103b and the bottom portion 58b of the inner cylinder 58a of the operation unit 58, and both end portions of the compression coil spring 105 are pressed against the bottom portion 103d and the bottom portion 58b, respectively.

As a result, the operation unit 58 is biased inward in the vehicle width direction with respect to the collar member 103, the male tapered portion 58c of the operation unit 58 is pressed against the inner peripheral surface of the large-diameter hole portion 53n of the guide hole 53g of the fixing member 53, and the operation unit 58 is maintained in the locked state.

In the locked state of the operation unit 58 illustrated in A, the windscreen 42 (see FIG. 6) is held at a low position. In order to change the locked state of the operation unit 58 illustrated in A to the unlocked state of the operation unit 58 illustrated in B, first, as indicated by arrow C, the grip portions 58*e* of the left and right operation units 58 are respectively gripped and slid outward in the vehicle width direction along the shaft 67. As a result, the male tapered portion 58*c* of the operation unit 58 is detached from the large-diameter hole portion 53*n* of the guide hole 53*g* of the fixing member 53.

Then, in this state, as indicated by arrow D, the left and right operation units 58 are moved to the side of the large-diameter hole portion 53*n* at the upper end portion of the guide hole 53*g* along the guide hole 53*g*. Then, the left and right operation units 58 are slid inward in the vehicle width direction, and the male tapered portion 58*c* is inserted into the large-diameter hole portion 53*n* on the upper side. At this time, since the operation unit 58 is biased inward in the vehicle width direction by the compression coil spring 105, the male tapered portion 58*c* is pressed against the large-diameter hole portion 53*n* of the guide hole 53*g*, and the operation unit 58 is in the locked state. As a result, the windscreen 42 is held at a high position.

Figure 8:
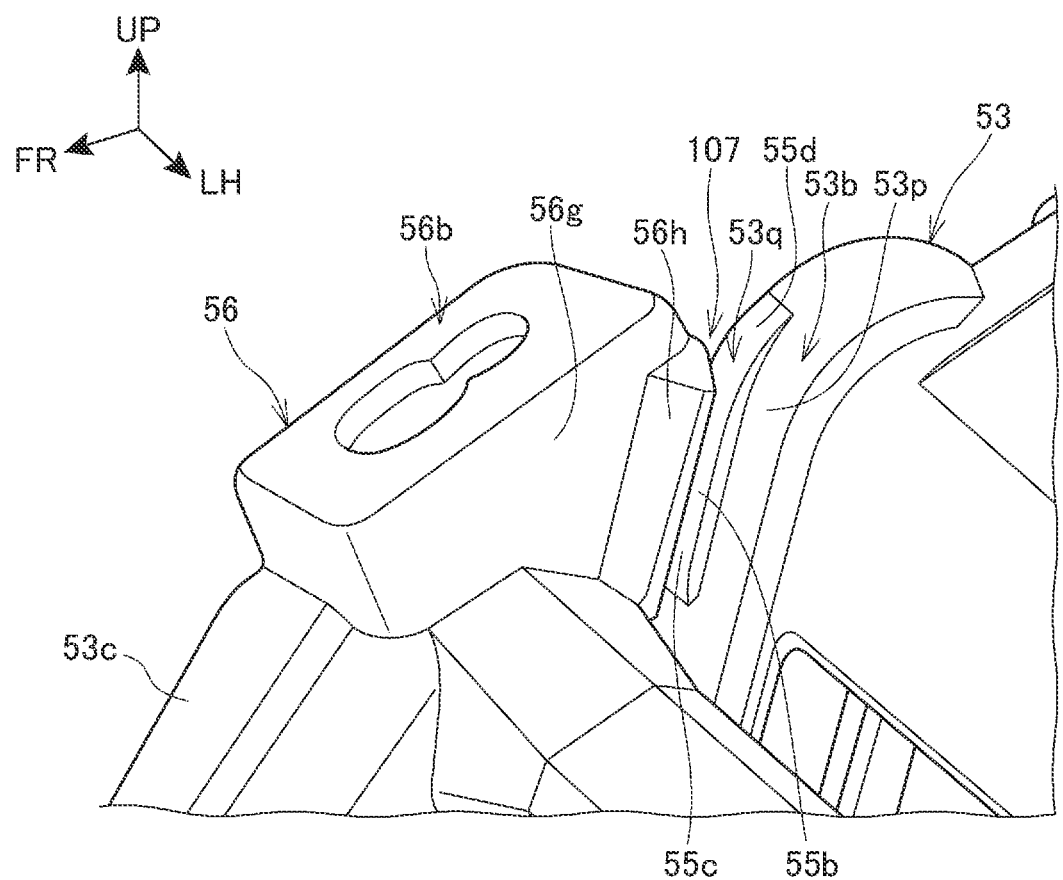
FIG. 8 is a perspective view illustrating a low position abutment portion between a fixing member and a screen attachment member.

FIG. 8 is a perspective view illustrating a low position abutment portion 107 between the fixing member 53 and the screen attachment member 56.

On the front surface 53*p* of the upper portion of each of the left and right vertically extending portions 53*b* of the fixing member 53, a vertically long fixing portion upper protruding portion 53*q* protruding forward is integrally formed.

The fixing portion upper protruding portion 53*q* includes, on a front surface 55*b* thereof, a flat surface 55*c* formed at a lower portion, and a curved surface 55*d* extending so as to curve backward from an upper end of the flat surface 55*c*.

In addition, an inner portion protruding portion 56*h* which protrudes inward in the vehicle width direction and is brought into contact with the fixing portion upper protruding portion 53*q* of the fixing member 53 is formed on a rear portion of an inner side surface 56*g* of the upper attachment seat 56*b* of the screen attachment member 56.

The fixing portion upper protruding portion 53*q* and the inner portion protruding portion 56*h* described above constitute a low position abutment portion 107 that comes into an abutting state when the windscreen 42 (see FIG. 6) is at a low position.

When the screen attachment member 56 together with the windscreen 42 (see FIG. 6) descends from above to the lowermost end of elevation, the inner portion protruding portion 56*h* is in contact with the fixing portion upper protruding portion 53*q*. In this state, the screen attachment member 56 is held without rattling with respect to the fixing member 53.

In addition, when the screen attachment member 56 ascends from the lowermost end of elevation, the inner portion protruding portion 56*h* is separated from the fixing portion upper protruding portion 53*q*, so that holding of the screen attachment member 56 with respect to the fixing member 53 is released.

Since the front surface 55*b* of the fixing portion upper protruding portion 53*q* gradually curves backward from the lower end side to the upper end side, the abutment force of the inner portion protruding portion 56*h* with respect to the fixing portion upper protruding portion 53*q* gradually increases after the inner portion protruding portion 56*h* starts being in contact with the fixing portion upper protruding portion 53*q* from above. With such a structure, it is possible to make the inner portion protruding portion 56*h* easily and smoothly be in contact with the fixing portion upper protruding portion 53*q* and also secure the holding force by which the fixing member 53 holds the screen attachment member 56 easily.

Figure 9:
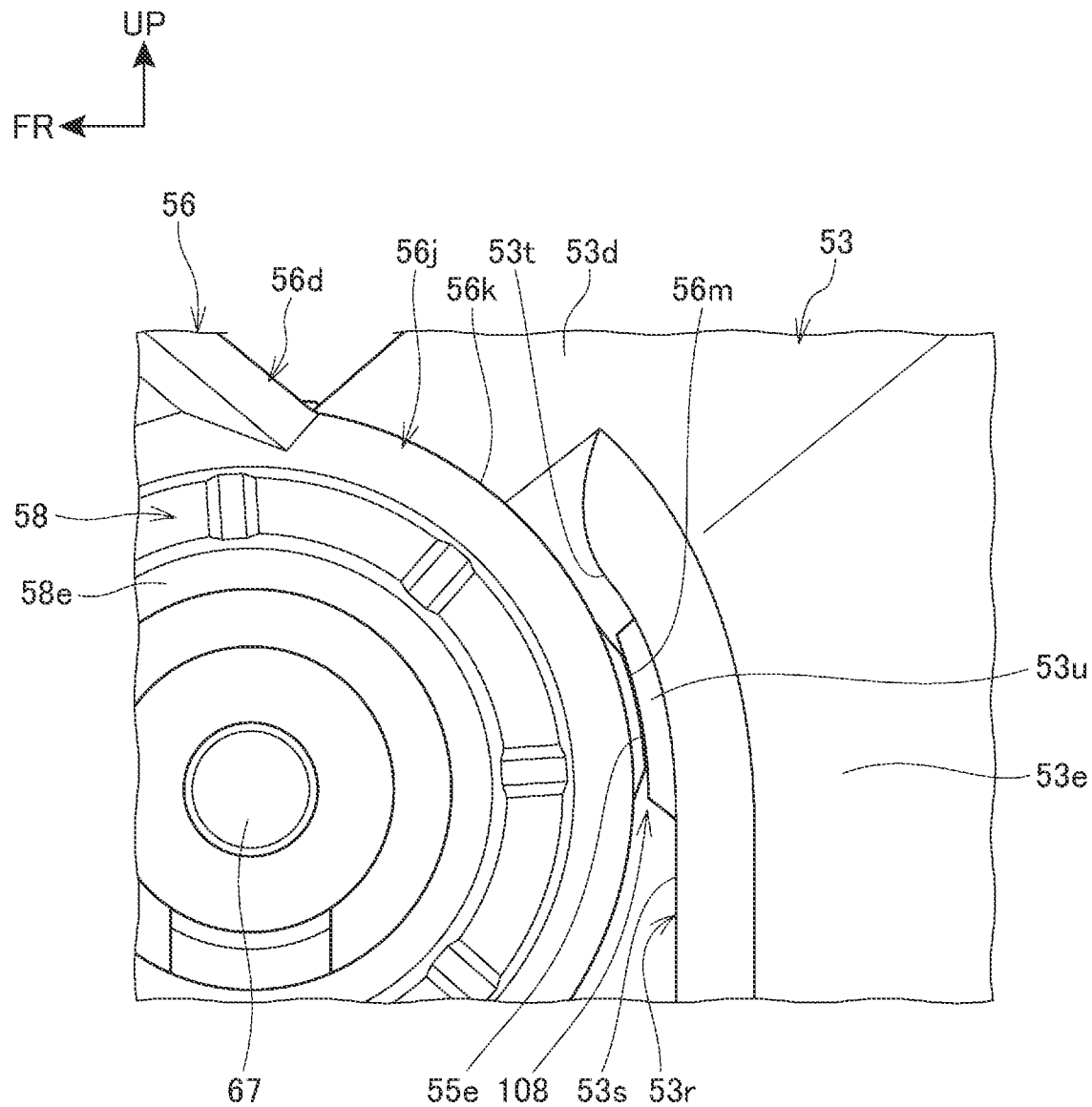
FIG. 9 is a side view illustrating a high position abutment portion between the fixing member and the screen attachment member.

FIG. 9 is a side view illustrating a high position abutment portion 108 between the fixing member 53 and the screen attachment member 56.

A front surface 53*r* of each of the left and right side wall portions 53*e* of the fixing member 53 includes upper and lower surfaces 53*s* extending vertically and a curved surface 53*t* curved forward from the upper end of the upper and lower surfaces 53*s*, and a front protruding portion 53*u* protruding forward is formed over the upper and lower surfaces 53*s* and the curved surface 53*t*.

In addition, a rear protruding portion 56*m* which protrudes rearward and is brought into contact with the front protruding portion 53*u* of the fixing member 53 is formed at a rear portion of a cylindrical lower cylinder portion 56*j* (specifically, an outer peripheral surface 56*k* of the lower cylinder portion 56*j*) provided at a lower portion of the lower upright portion 56*d* of the screen attachment member 56.

The front protruding portion 53*u* of the fixing member 53 described above and the rear protruding portion 56*m* of the screen attachment member 56 constitute a high position abutment portion 108 that comes into an abutting state when the windscreen 42 (see FIG. 6) is at a high position.

When the screen attachment member 56 together with the windscreen 42 ascends from below to the highest end of elevation, the rear protruding portion 56*m* is in contact with the front protruding portion 53*u*. In this state, the screen attachment member 56 is held without rattling with respect to the fixing member 53.

In addition, when the screen attachment member 56 descends from the uppermost end of elevation, the rear protruding portion 56*m* is separated from the front protruding portion 53*u*, so that holding of the screen attachment member 56 with respect to the fixing member 53 is released.

The front protruding portion 53*u* is formed over the upper and lower surfaces 53*s* and the curved surface 53*t*. Since the front surface 55*e* of the front protruding portion 53*u* curves so as to gradually protrude forward from the lower end side to the upper end side, the abutment force of the rear protruding portion 56*m* with respect to the front protruding portion 53*u* gradually increases after the rear protruding portion 56*m* starts being in contact with the front protruding portion 53*u* from below. With such a structure, it is possible to make the rear protruding portion 56*m* easily and smoothly be in contact with the front protruding portion 53*u* and also secure the holding force by which the fixing member 53 holds the screen attachment member 56 easily.

Figure 10:
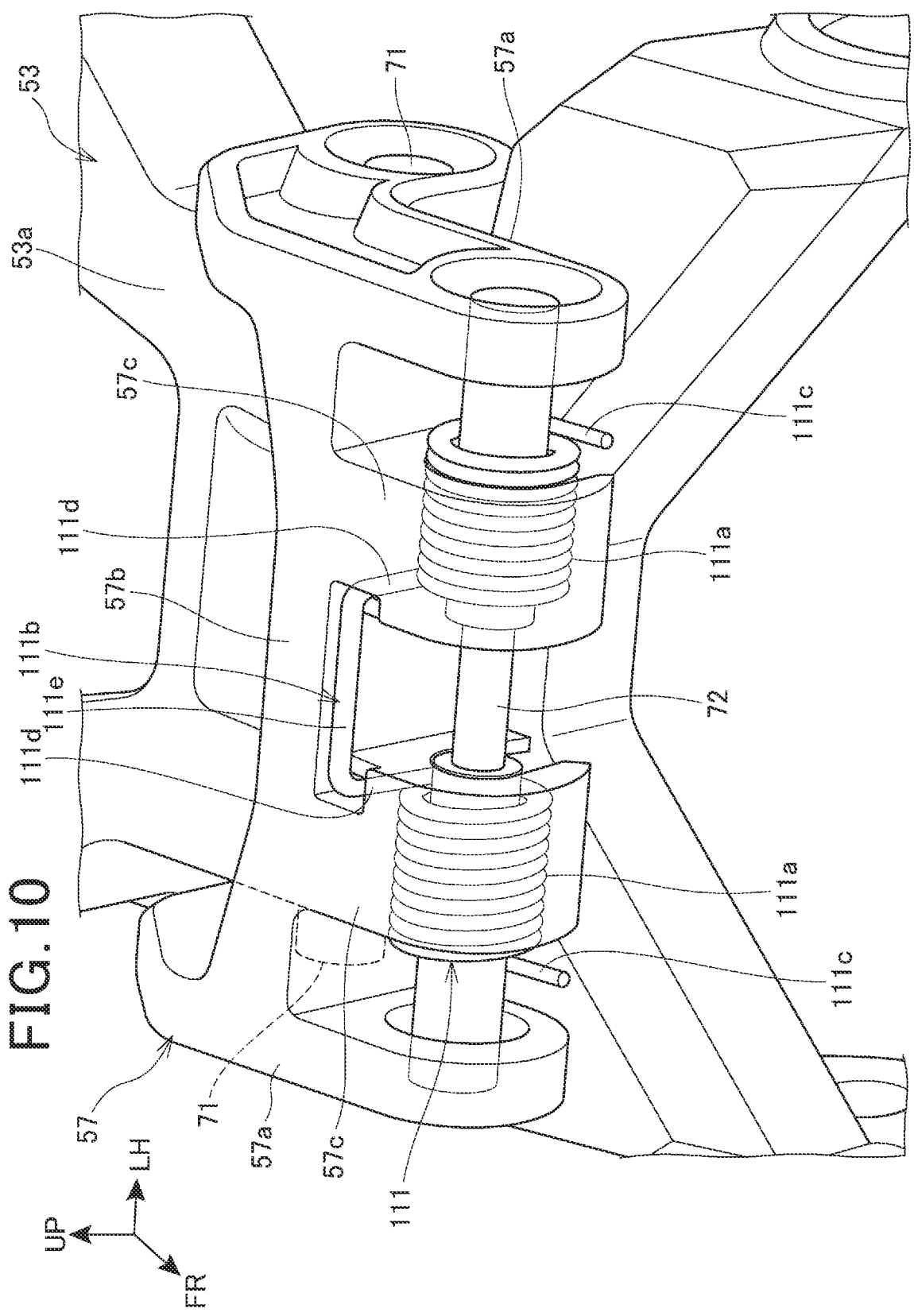
FIG. 10 is a perspective view illustrating an attachment state of a link.

FIG. 10 is a perspective view illustrating an attachment state of the link 57.

The support shaft 72 extends between the front end portions of the left and right arm portions 57*a* of the link 57, and a torsion coil spring 111 is fitted to the support shaft 72.

The link 57 includes a pair of left and right spring cover portions 57*c* extending forward from the cross portion 57*b*, and a part of the torsion coil spring 111 is covered from the front and the upper side by the left and right spring cover portions 57*c*. The support shaft 72 is retained by the left and right arm portions 57*a* with snap rings.

The torsion coil spring 111 integrally includes a pair of left and right coil spring bodies 111*a* and a spring connection portion 111*b* connecting the left and right coil spring bodies 111*a*.

Each of the left and right coil spring bodies 111a includes outer end portions 111c locked to the screen attachment member 56 (see FIG. 4) on the outer side in the vehicle width direction.

The spring connection portion 111b includes a pair of left and right inner end portions 111d extending from the left and right coil spring bodies 111a, respectively, and a cross connection portion 111e extending in the vehicle width direction and connecting the left and right inner end portions 111d. The left and right inner end portions 111d are locked to locking portions formed on the inner side surfaces of the left and right spring cover portions 57c, respectively.

The torsion coil spring 111 described above biases the link 57 so as to swing upward about the left and right support shafts 71.

Figure 11:
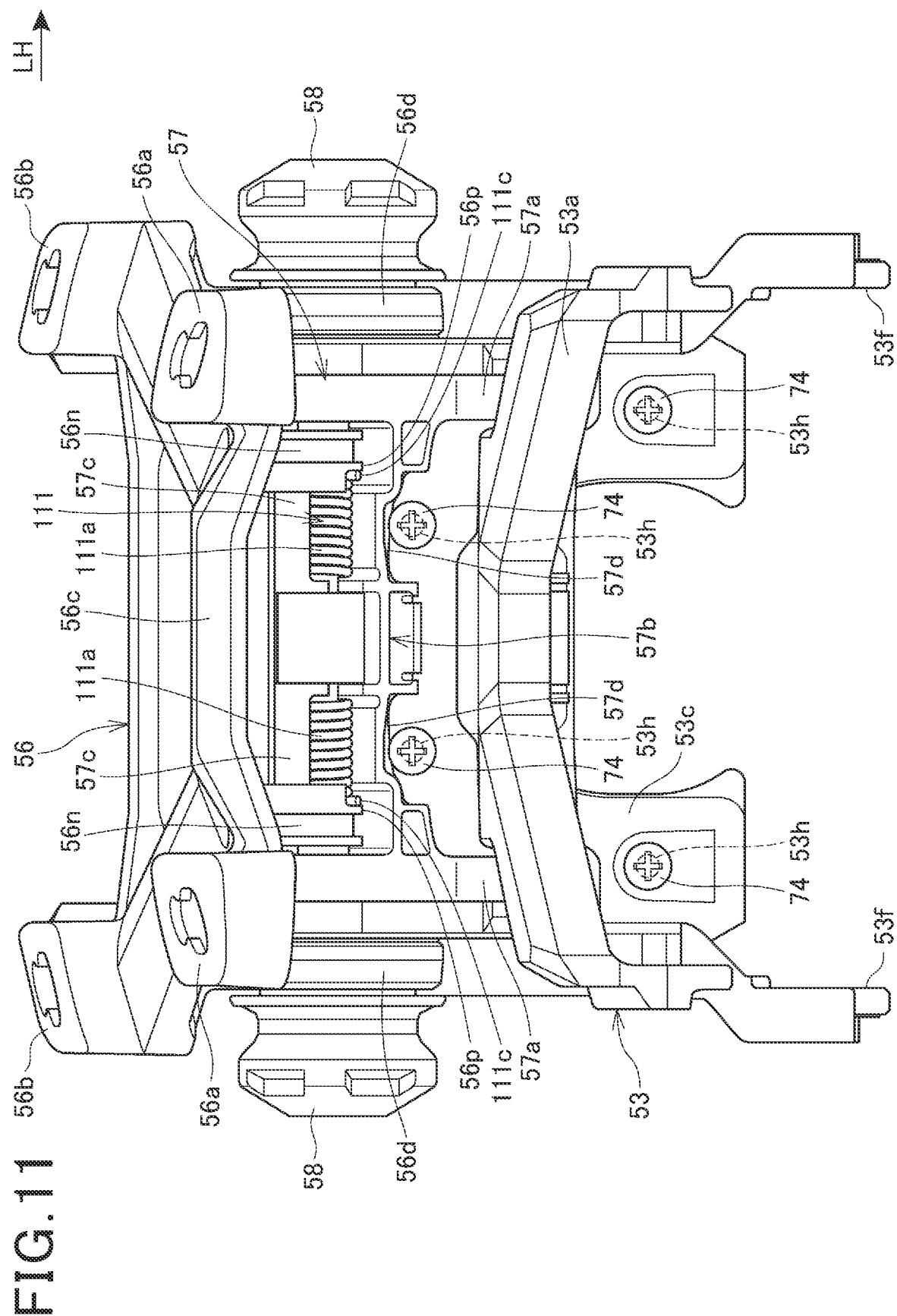
FIG. 11 is a view taken in the direction of arrow XI in FIG. 4.

FIG. 11 is a view taken in the direction of arrow XI in FIG. 4.

The plurality of screw insertion holes 53h are formed in the rear wall portion 53c of the fixing member 53, and the meter 43 (see FIG. 4) is fastened by the screws 74 passed through each of the screw insertion holes 53h.

The link 57 includes, below the cross portion 57b, a pair of left and right link recessed portions 57d for securing a path for moving the screw 74 to the screw insertion hole 53h and a path (tool path) for moving a tool (such as a screwdriver) for tightening the screw 74.

By providing the left and right link recessed portions 57d in this manner, it is possible to improve attachment workability when attaching the meter 43 to the rear wall portion 53c.

The screen attachment member 56 includes a pair of left and right downward protruding portions 56n protruding downward from the attachment seat connection portion 56c, and includes outer locking portions 56p that lock left and right outer end portions 111c of the torsion coil spring 111 on inner side surfaces of lower end portions of the left and right downward protruding portions 56n.

Figure 12:
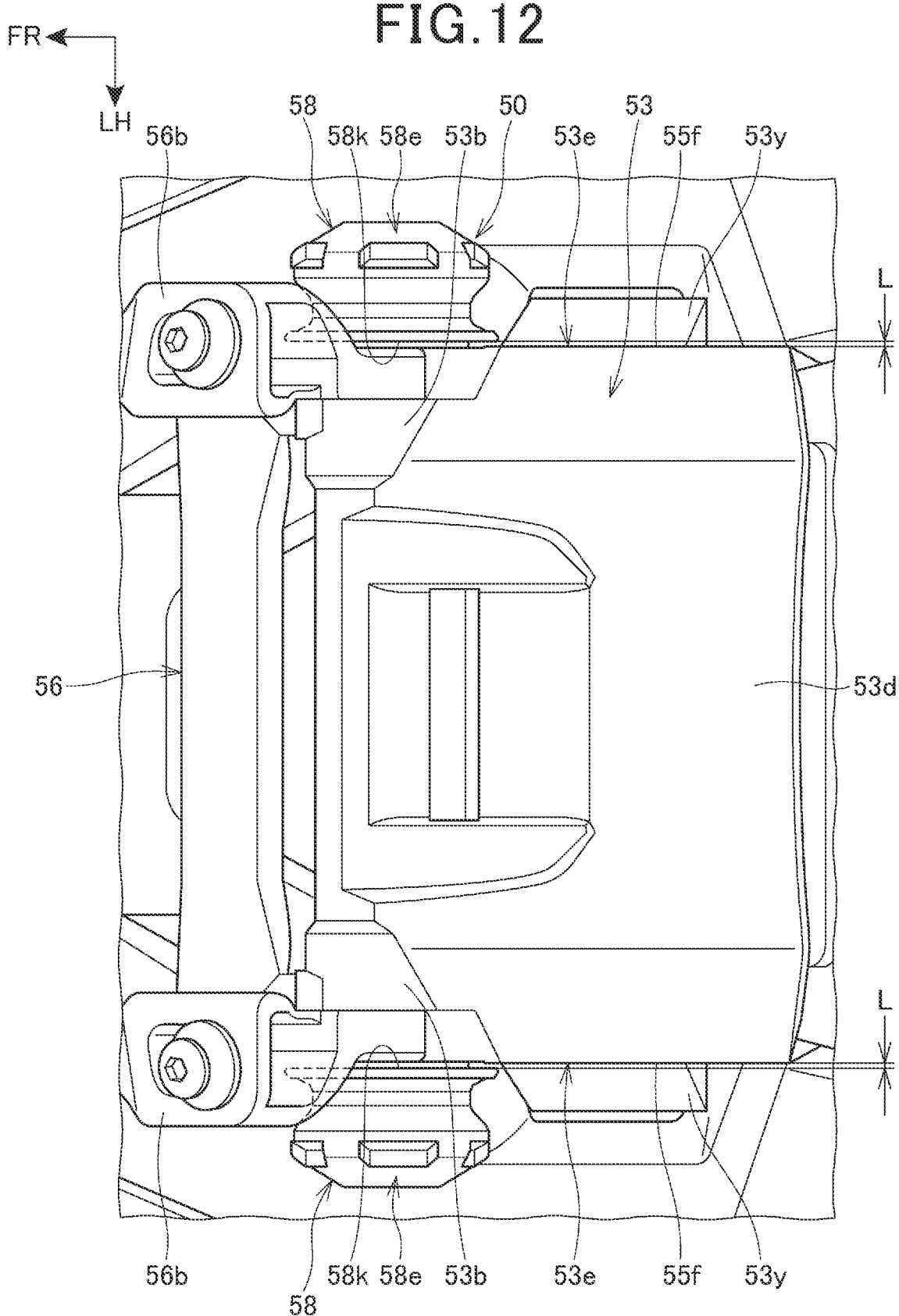
FIG. 12 is a plan view of a main part illustrating the windscreen elevating mechanism and the periphery thereof.

FIG. 12 is a plan view of a main part illustrating the windscreen elevating mechanism 50 and the periphery thereof.

The left and right operation units 58 protrude laterally from the left and right vertically extending portions 53b of the fixing member 53, respectively.

The left and right side edges of the overhanging portion 53d coincide with the upper edges of the outer side surfaces 55f of the left and right side wall portions 53e, and the grip portions 58e of the left and right operation units 58 are disposed outside in the vehicle width direction of the outer side surfaces 55f of the left and right side wall portions 53e and the overhanging portion 53d, respectively.

The inner end 58k of the grip portion 58e is separated outward in the vehicle width direction by distance L with respect to the outer side surface 55f of the side wall portion 53e.

As described above, the left and right grip portions 58e protrude laterally from the left and right side wall portions 53e and the overhanging portion 53d, so that when the driver who rides on the vehicle operates the left and right grip portions 58e by extending his/her both hands forward, it is possible to easily grip the left and right grip portions 58e by extending his/her hands forward substantially straight on the sides of the left and right side wall portions 53e and the overhanging portion 53d.

Figure 13:
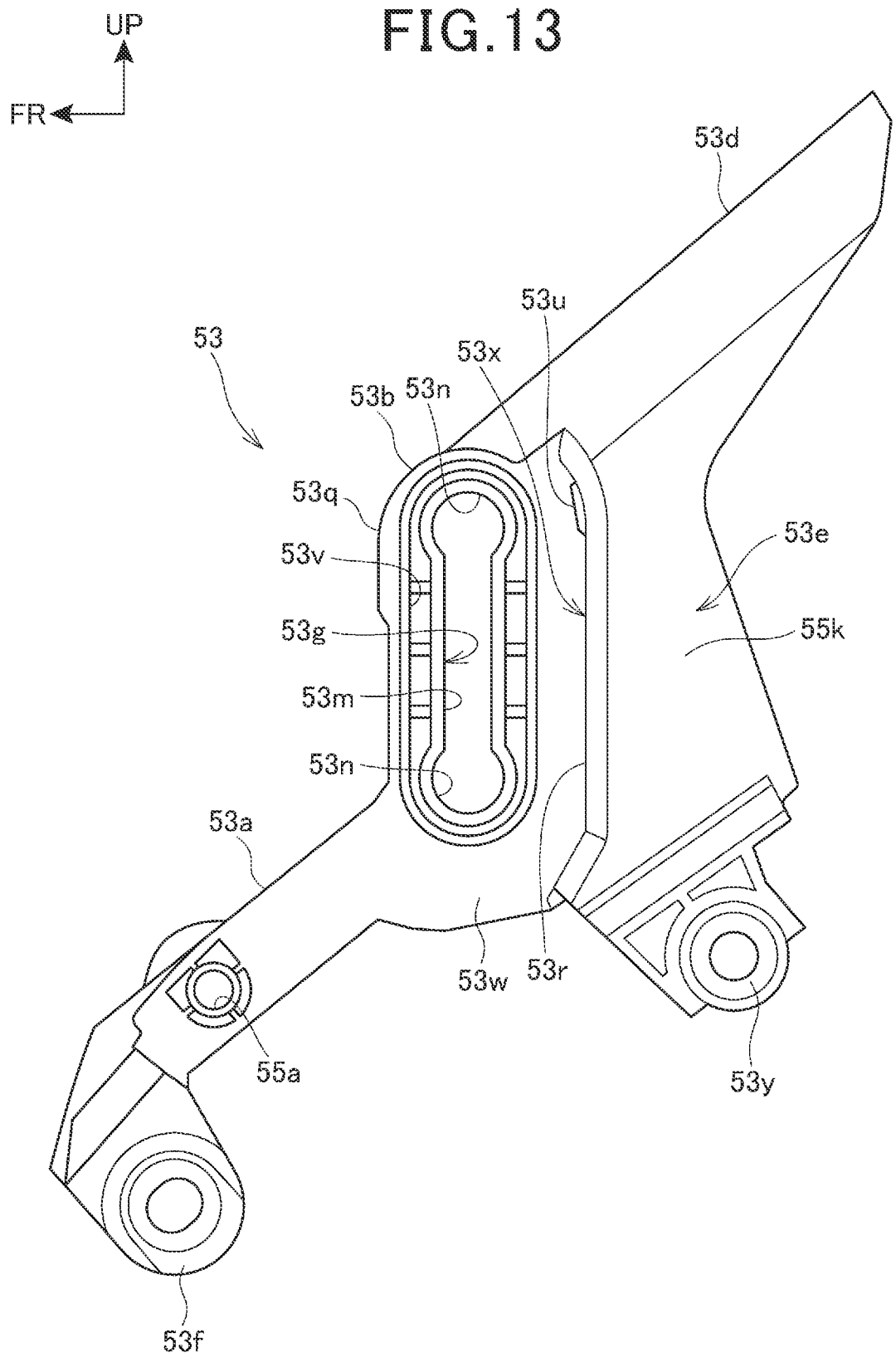
FIG. 13 is a left side view illustrating the fixing member.
Figure 14:
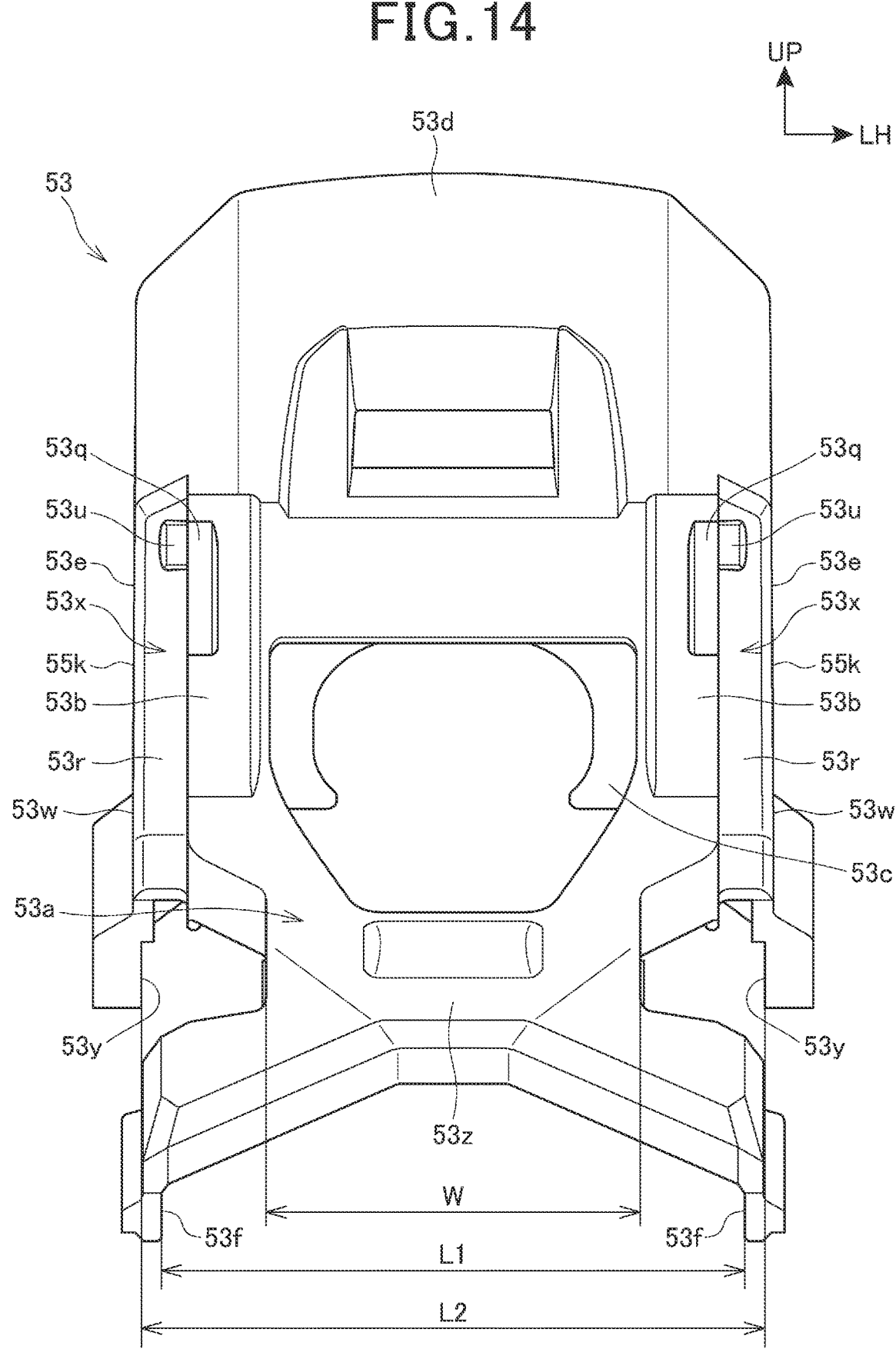
FIG. 14 is a front view illustrating the fixing member.
Figure 15:
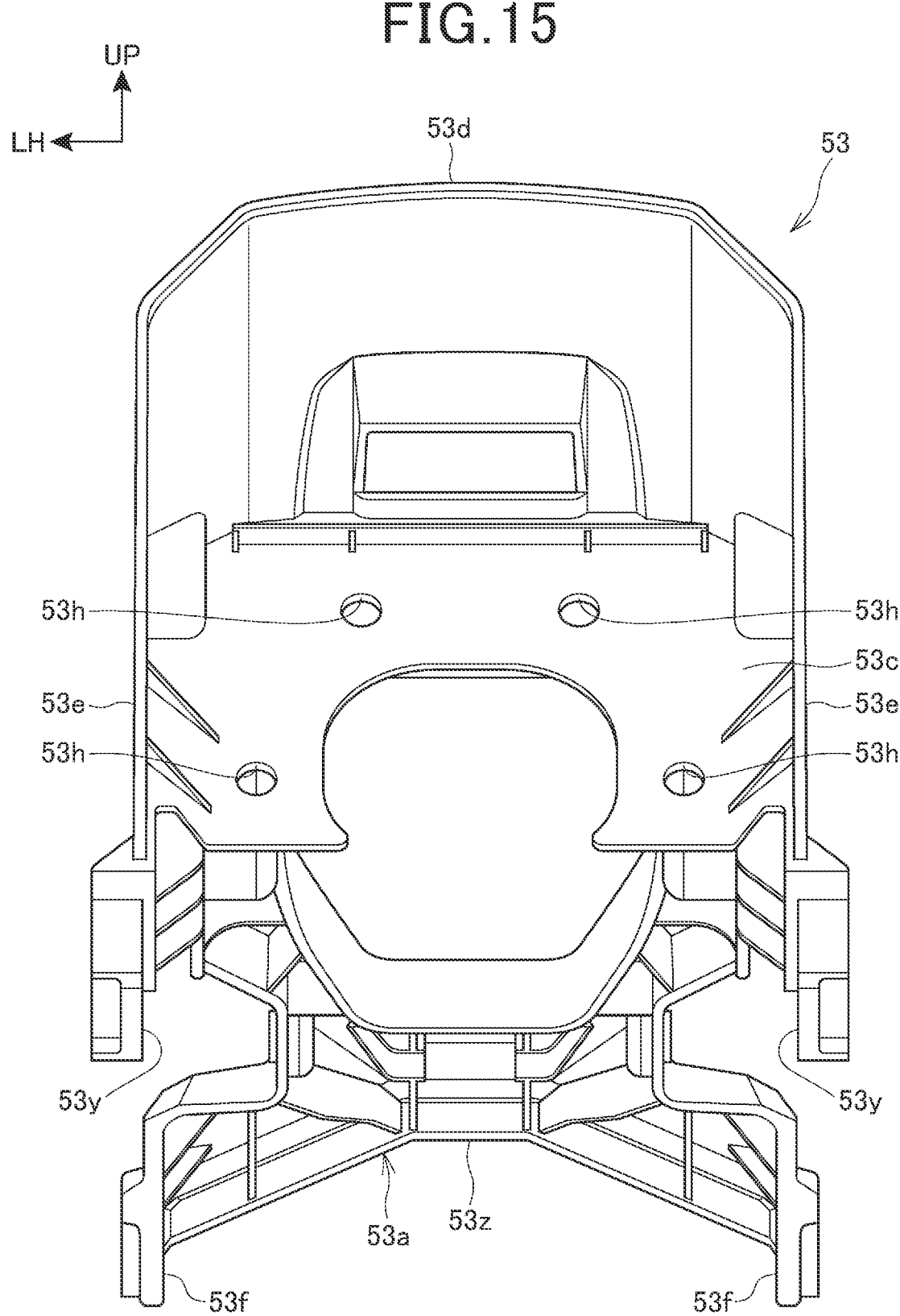
FIG. 15 is a rear view illustrating the fixing member.

FIG. 13 is a left side view illustrating the fixing member 53, FIG. 14 is a front view illustrating the fixing member 53, and FIG. 15 is a rear view illustrating the fixing member 53.

As illustrated in FIGS. 13 to 15, the left and right vertically extending portions 53b each include a vertically long oval recess portion 53v and a peripheral wall 53w formed around the recess portion 53v.

In addition, since a front wall 53x of each of the left and right side wall portions 53e includes the front surface 53r and the front wall 53x and the peripheral wall 53w are bent at substantially right angles, it is possible to improve the rigidity of the vertically extending portion 53b and the side wall portion 53e.

Rear left and right lower end portions 53y are respectively formed at lower end portions of the left and right side wall portions 53e, and the left and right rear left and right lower end portions 53y are attached to the front bracket 92 (see FIG. 6).

The front inclined portion 53a is formed in an X shape, and width W in the vehicle width direction of a central portion 53z of X is smaller than distance L1 between the left and right front left and right lower end portions 53f and distance L2 between the left and right rear left and right lower end portions 53y (W<L1<L2).

A shaft insertion hole 55a through which the support shaft 71 (see FIG. 4) of the link 57 passes is formed in the central portion 53z of the front inclined portion 53a.

As described above, by reducing width W of the central portion 53z of the front inclined portion 53a, it is possible to reduce the link 57 connected to the central portion 53z in size and weight.

In addition, by making distance L1 between the left and right front left and right lower end portions 53f and distance L2 between the left and right rear left and right lower end portions 53y larger than width W of the central portion 53z, it is possible to improve the support rigidity of the fixing member 53 with respect to the front bracket 92.

Figure 16:
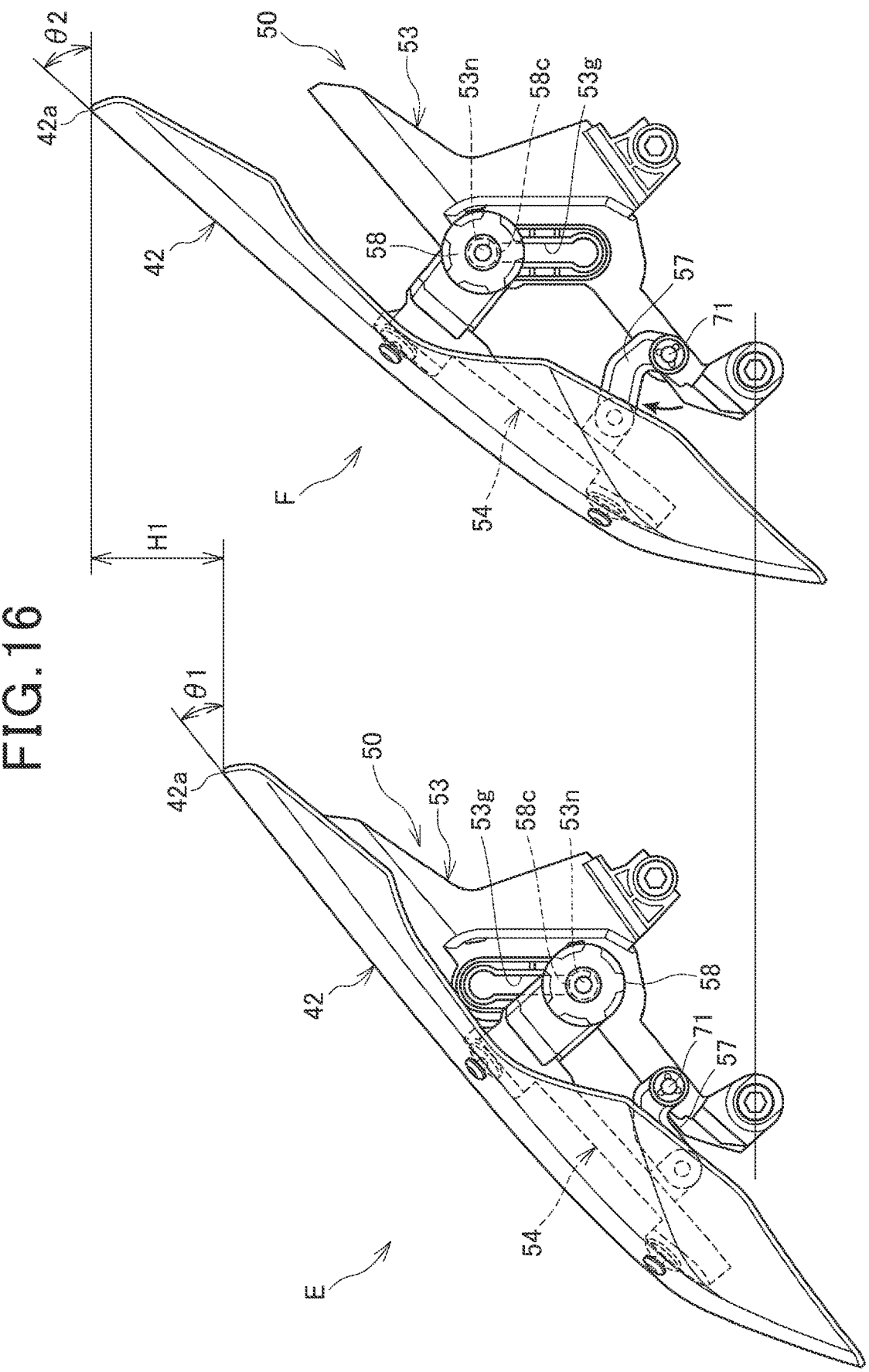
FIG. 16 is a functional diagram illustrating an elevated state of the windscreen.

FIG. 16 is a functional diagram illustrating an elevated state of the windscreen 42.

The windscreen 42 can be manually elevated from a low position state illustrated in E to a high position state illustrated in F.

In the low position state illustrated in E, the male tapered portion 58c of the operation unit 58 is inserted into the large-diameter hole portion 53n on the lower side of the guide hole 53g, and the link 57 is in a state of swinging to the foremost side against the elastic force of the torsion coil spring 111 (see FIG. 10).

In addition, in the high position state illustrated in F, the male tapered portion 58c of the operation unit 58 is inserted into the large-diameter hole portion 53n on the upper side of the guide hole 53g, and the link 57 is in a state of swinging to the rearmost side as indicated by an arrow from the low position state illustrated in E by the elastic force of the torsion coil spring 111.

The upper end 42a of the windscreen 42 ascends by height H1 from the low position state indicated by E to the high position state indicated by F. In addition, in the upper portion of the windscreen 42, the inclination angle from the horizontal line 113 increases from θ1 to θ2.

As described above, the windscreen elevating mechanism 50 can adjust the inclination angle in addition to adjusting the height of the windscreen 42.

Figure 17:
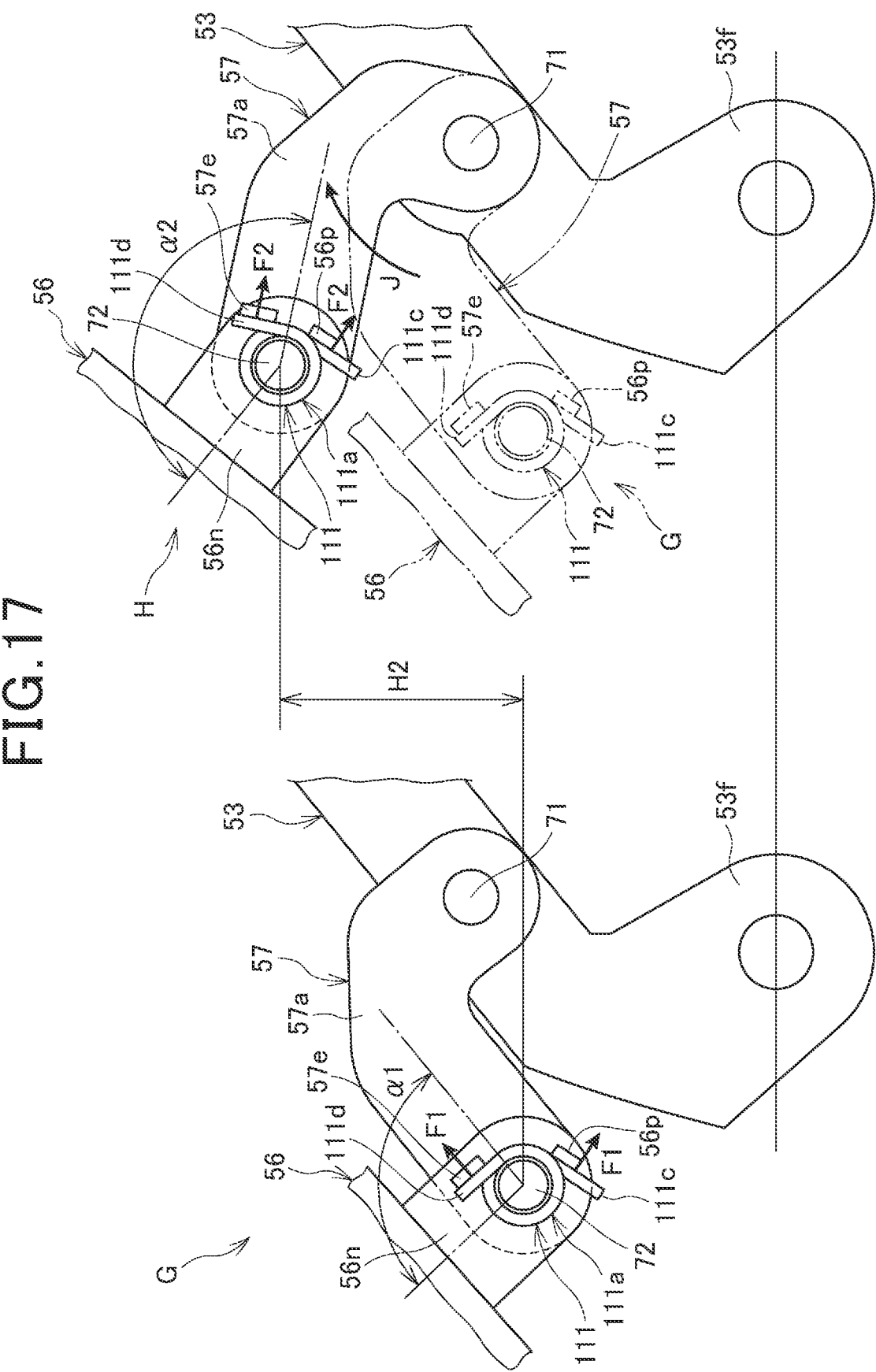
FIG. 17 is a functional diagram illustrating an operation of the link when the windscreen is elevated.

FIG. 17 is a functional diagram illustrating an operation of the link 57 when the windscreen 42 is elevated.

The link 57 is swingable from a state of swinging to the foremost side (a state in which the operation unit 58 (see FIG. 16) is disposed at the lowermost side) indicated by G to a state of swinging to the rearmost side (a state in which the operation unit 58 is disposed at the uppermost side) indicated by H.

At this time, the link 57 is automatically swung by the elastic force of the torsion coil spring 111 when the left and right operation units 58 are moved up and down.

In the state indicated by G, the left and right outer end portions 111c of the torsion coil spring 111 are locked to the outer locking portion 56p of the screen attachment member 56, and the left and right inner end portions 111d of the torsion coil spring 111 are locked to the inner locking portion 57e formed in the spring cover portion 57c (see FIG. 10) of the link 57.

The torsion coil spring 111 presses the outer locking portion 56p and the inner locking portion 57e with the elastic force F1 by the outer end portion 111c and the inner end portion 111d, respectively. This elastic force F1 acts in a direction of increasing angle α1 formed between the arm portion 57a of the link 57 and the downward protruding portion 56n of screen attachment member 56.

In the state indicated by H, by swinging as indicated by arrow J from the state indicated by G, the angle formed between the arm portion 57a of the link 57 and the downward protruding portion 56n of the screen attachment member 56 increases to α2 (>α1). In addition, the elastic force pressing the outer locking portion 56p and the inner locking portion 57e by the outer end portion 111c and the inner end portion 111d is F2 (<F1). In addition, the support shaft 72 ascends by height H2.

As described above, the windscreen elevating mechanism 50 is provided with the torsion coil spring 111 that biases the link 57 to swing, so that the posture of the windscreen 42 can be changed by swinging the link 57 just by operating the left and right operation units 58. As a result, it is possible to improve the usability of the windscreen elevating mechanism 50.

As illustrated in FIGS. 2 and 7 described above, the motorcycle 10 as a saddle ride type vehicle includes the windscreen 42, the screen attachment member 56 as a holder portion that supports the windscreen 42, and the fixing member 53 as a bracket that vertically movably supports the screen attachment member 56 together with the windscreen 42 and is fixed to the vehicle body.

In the motorcycle 10, the shaft 67 is supported by the fixing member 53 so as to be vertically movable, the shaft 67 passes through the lower upright portion 56d as the extending portion of the screen attachment member 56 provided on the outer side in the vehicle width direction of the fixing member 53, and the operation unit 58 is slidably provided at the end portion of the shaft 67.

The operation unit 58 includes a grip portion 58e to be gripped when being slid and a flange portion 58h disposed inside in the vehicle width direction of the grip portion 58e. The grip portion 58e includes an outer grip portion 58f disposed outside in the vehicle width direction and an inner grip portion 58g disposed inside in the vehicle width direction of the outer grip portion 58f, and the flange portion 58h is formed to have a larger diameter than the inner grip portion 58g.

According to this configuration, while achieving cost reduction by adopting the structure in which the operation unit 58 is manually operated, since the operation unit can be operated while preventing insertion of a finger between the flange portion 58h and the screen attachment member 56 by disposing the flange portion 58h between the grip portion 58e and the screen attachment member 56, it is possible to improve operability of the operation unit.

In addition, as illustrated in FIG. 7, the inner grip portion 58g is formed to have a smaller diameter than the outer grip portion 58f.

According to this configuration, by providing the inner grip portion 58g, it is possible to put fingers on the grip portion 58e easily and improve the operability of the operation unit 58.

As illustrated in FIGS. 8 and 9, the fixing member 53 and the screen attachment member 56 are provided with the low position abutment portion 107 and the high position abutment portion 108 as abutment portions where the fixing member 53 and the screen attachment member 56 abut against each other.

According to this configuration, by providing the low position abutment portion 107 and the high position abutment portion 108, it is possible to hold the fixing member 53 and the screen attachment member 56 without rattling, so that it is possible to improve the merchantability and also the operation feeling.

As illustrated in FIGS. 5 and 6, the fixing member 53 includes the rear wall portion 53c as a meter fixing portion that fixes the meter 43 behind screen attachment member 56.

According to this configuration, the fixing member 53 can also serve as the meter fixing portion, and it is possible to reduce the number of components.

In addition, the meter 43 is fixed by the screw 74 as a fastening member inserted from a side of the screen attachment member 56 to the screw insertion hole 53h as a meter fixing through-hole formed in the rear wall portion 53c.

According to this configuration, since the meter 43 is fixed to the rear wall portion 53c from the backside, it is possible to improve appearance around the meter 43 and also downsize the fixing member 53.

As illustrated in FIGS. 2 and 11, the link 57 that connects the screen attachment member 56 to the fixing member 53 is provided, and the link 57 is provided with the link recessed portion 57d as the recessed portion that secures the tool path for tightening the screw 74 when the meter 43 is attached.

According to this configuration, it is possible to improve attachment workability of the meter 43 and also rigidity of the link 57 itself.

As illustrated in FIGS. 10 and 17, the link 57 includes a pair of the left and right arm portions 57a, the cross portion 57b connecting the left and right arm portions 57a in the vehicle width direction, and the spring cover portion 57c as a forward extending portion extending forward from the cross portion 57b.

The torsion coil spring 111 as a link biasing member that biases the link 57 in a direction in which the windscreen 42 ascends is fitted to the support shaft 72 that couples the left and right arm portions 57a to the screen attachment member 56. The torsion coil spring 111 is covered from the front and the upper side by the spring cover portion 57c.

According to this configuration, it is possible to cover the torsion coil spring 111 with the spring cover portion 57c provided in the link 57 to improve the appearance, and also it is possible to reduce the number of components since the link 57 also serves as a spring cover member.

As illustrated in FIGS. 4 and 12, the grip portions 58e of the left and right operation units 58 are disposed outside in the vehicle width direction of the outer side surfaces 55f of the left and right side wall portions 53e of the fixing member 53.

According to this configuration, it is possible to easily hold the grip portion 58e of the operation unit 58 by extending the hand forward on the side of the left and right side wall portions 53e of the fixing member 53.

The embodiment described above is merely an embodiment of the present invention and can be arbitrarily modified and applied within a range not departing from the spirit of the present invention.

For example, in the above embodiment, as illustrated in FIG. 7, the operation unit 58 is biased inward in the vehicle width direction, and the operation unit 58 is slid outward in the vehicle width direction to release the lock with the fixing member 53, but the present invention is not limited thereto. For example, by biasing the operation unit 58 outward in the vehicle width direction, the lock with the fixing member 53 may be released by sliding the operation unit 58 inward in the vehicle width direction.

In addition, as illustrated in FIGS. 8 and 9, the low position abutment portion 107 and the high position abutment portion 108 are provided at different locations, but the present invention is not limited thereto. For example, the fixing portion upper protruding portion 53q may be provided on (a lower portion of) the front surface 53r of the side wall portion 53e, and this fixing portion upper protruding portion 53q may be a low position abutment portion where the rear protruding portion 56m is abutted against. In this case, the low position abutment portion and the high position abutment portion 108 are provided on the same front surface 53r.

In addition, the present invention may be applied not only to the motorcycle 10 but also to a saddle ride type vehicle including vehicles other than the motorcycle 10. Note that the saddle ride type vehicle includes all vehicles to ride being astride a vehicle body and is a vehicle including not only a motorcycle (including a motorized bicycle) but also a three-wheeled vehicle and a four-wheeled vehicle classified as an ATV (all-terrain vehicle).

REFERENCE SIGNS LIST

10 Motorcycle (saddle ride type vehicle)
42 Windscreen
43 Meter
53 Fixing member (bracket)
53c Rear wall portion (meter fixing portion)
53h Screw insertion hole (meter fixing through-hole)
55f Outer side surface
56 Screen attachment member (holder portion)
56d Lower upright portion (extending portion)
57 Link
57a Arm portion
57b Cross portion
57c Spring cover portion (forward extending portion)
57d Link recessed portion (recessed portion)
58 Operation unit
58e Grip portion
58f Outer grip portion
58g Inner grip portion
58h Flange portion

The invention claimed is:

1. A saddle ride type vehicle comprising: a windscreen; a holder portion that supports the windscreen; and a bracket that vertically movably supports the holder portion together with the windscreen and is fixed to a vehicle body, wherein a shaft is vertically movably supported by the bracket, the shaft passes through an extending portion of the holder portion provided outside in a vehicle width direction of the bracket, an operation unit is slidably provided at an end portion of the shaft, the operation unit includes a grip portion gripped when being slid and a flange portion disposed inside in the vehicle width direction of the grip portion, the grip portion includes an outer grip portion disposed outside in the vehicle width direction and an inner grip portion disposed inside in the vehicle width direction of the outer grip portion, and the flange portion is formed to have a larger diameter than the inner grip portion.

2. The saddle ride type vehicle according to claim 1, wherein the inner grip portion is formed to have a smaller diameter than the outer grip portion.

3. The saddle ride type vehicle according to claim 1, wherein the bracket and the holder portion are provided with an abutment portion where the bracket and the holder portion abut against each other.

4. The saddle ride type vehicle according to claim 1, wherein the bracket includes a meter fixing portion that fixes a meter behind the holder portion.

5. The saddle ride type vehicle according to claim 4, wherein the meter is fixed by a fastening member inserted from a side of the holder portion to a meter fixing through-hole formed in the meter fixing portion.

6. The saddle ride type vehicle according to claim 5, further comprising a link that connects the holder portion to the bracket, wherein the link is provided with a recessed portion that secures a tool path for tightening the fastening member when the meter is attached.

7. The saddle ride type vehicle according to claim 1, wherein the grip portion of the operation unit is disposed outside in the vehicle width direction of an outer side surface of the bracket.

8. The saddle ride type vehicle according to claim 2, wherein the bracket and the holder portion are provided with an abutment portion where the bracket and the holder portion abut against each other.

9. The saddle ride type vehicle according to claim 2, wherein the bracket includes a meter fixing portion that fixes a meter behind the holder portion.

10. The saddle ride type vehicle according to claim 9, wherein the meter is fixed by a fastening member inserted from a side of the holder portion to a meter fixing through-hole formed in the meter fixing portion.

11. The saddle ride type vehicle according to claim 10, further comprising a link that connects the holder portion to the bracket, wherein the link is provided with a recessed portion that secures a tool path for tightening the fastening member when the meter is attached.

12. The saddle ride type vehicle according to claim 3, wherein the bracket includes a meter fixing portion that fixes a meter behind the holder portion.

13. The saddle ride type vehicle according to claim 12, wherein the meter is fixed by a fastening member inserted from a side of the holder portion to a meter fixing through-hole formed in the meter fixing portion.

14. The saddle ride type vehicle according to claim 13, further comprising a link that connects the holder portion to the bracket, wherein the link is provided with a recessed portion that secures a tool path for tightening the fastening member when the meter is attached.

15. The saddle ride type vehicle according to claim 2, wherein the grip portion of the operation unit is disposed outside in the vehicle width direction of an outer side surface of the bracket.

16. The saddle ride type vehicle according to claim 3, wherein the grip portion of the operation unit is disposed outside in the vehicle width direction of an outer side surface of the bracket.

17. The saddle ride type vehicle according to claim 4, wherein the grip portion of the operation unit is disposed outside in the vehicle width direction of an outer side surface of the bracket.

18. The saddle ride type vehicle according to claim 5, wherein the grip portion of the operation unit is disposed outside in the vehicle width direction of an outer side surface of the bracket.

19. The saddle ride type vehicle according to claim 6, wherein the grip portion of the operation unit is disposed outside in the vehicle width direction of an outer side surface of the bracket.

\* \* \* \* \*